US010839528B2

(12) United States Patent
Ross et al.

(10) Patent No.: US 10,839,528 B2
(45) Date of Patent: Nov. 17, 2020

(54) AUTHENTICATION-BASED TRACKING

(71) Applicant: Alitheon, Inc., Redmond, WA (US)

(72) Inventors: David Justin Ross, Redmond, WA (US); Scot E. Land, Redmond, WA (US)

(73) Assignee: ALITHEON, INC., Redmond, WA (US)

( * ) Notice: Subject to any disclaimer, the term of this patent is extended or adjusted under 35 U.S.C. 154(b) by 13 days.

(21) Appl. No.: 15/680,137

(22) Filed: Aug. 17, 2017

(65) Prior Publication Data

US 2018/0053312 A1 Feb. 22, 2018

Related U.S. Application Data

(60) Provisional application No. 62/377,436, filed on Aug. 19, 2016.

(51) Int. Cl.
*G06T 7/246* (2017.01)
*G06F 16/583* (2019.01)
(Continued)

(52) U.S. Cl.
CPC .......... *G06T 7/248* (2017.01); *G06F 16/5838* (2019.01); *G06K 9/00577* (2013.01);
(Continued)

(58) Field of Classification Search
CPC ............ G06Q 30/018; G06K 9/00577; G06K 9/00771; G06K 9/03; G06K 9/6202;
(Continued)

(56) References Cited

U.S. PATENT DOCUMENTS

| 4,218,674 A | 8/1980 | Broscow et al. |
| 4,423,415 A | 12/1983 | Goldman |

(Continued)

FOREIGN PATENT DOCUMENTS

| DE | 102006005927 A1 | 8/2007 |
| EP | 0439669 A2 | 8/1991 |

(Continued)

OTHER PUBLICATIONS

U.S. Appl. No. 13/410,753, filed Mar. 2, 2012, Document Fingerprinting.

(Continued)

*Primary Examiner* — Katrina R Fujita

(57) ABSTRACT

Methods and systems integrate digital fingerprint authentication-based identification and location tracking into a single, continuous process in which an authentication-integrated tracking system is simultaneously aware of both the identity and location of each physical object at all times as they move along a conveyance system. Insertion or removal of an object is quickly detected and reported. Rapid reestablishment and continuation of authentication-integrated tracking is enabled in the event of any temporary interruption or failure of tracking in the system. An exemplary system comprises plural tracking units networked together, each tracking unit including a camera or scanner to observe a corresponding field of view, the tracking units arrange to realize a continuous field of view of a physical conveyance system.

29 Claims, 12 Drawing Sheets

(51) Int. Cl.
*G06K 9/00* (2006.01)
*G06T 7/292* (2017.01)
*G06K 9/62* (2006.01)
*G06K 9/78* (2006.01)
*G06K 9/32* (2006.01)
*G06K 9/03* (2006.01)
*G06Q 30/00* (2012.01)

(52) U.S. Cl.
CPC ....... *G06K 9/00771* (2013.01); *G06K 9/6202* (2013.01); *G06K 9/78* (2013.01); *G06T 7/292* (2017.01); *G06K 9/03* (2013.01); *G06K 2009/3291* (2013.01); *G06K 2209/21* (2013.01); *G06Q 30/018* (2013.01); *G06T 2200/28* (2013.01); *G06T 2207/30112* (2013.01)

(58) Field of Classification Search
CPC ............. G06K 9/78; G06K 2009/3291; G06K 2209/21; G06T 7/248; G06T 7/292; G06T 2200/28; G06T 2207/30112; G06F 16/5838
See application file for complete search history.

(56) References Cited

U.S. PATENT DOCUMENTS

| | | |
|---|---|---|
| 4,677,435 A | 6/1987 | Causse D'Agraives et al. |
| 4,700,400 A | 10/1987 | Ross |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta, Jr. et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels, Jr. et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce |
| 7,477,780 B2 | 1/2009 | Boncyk et al. |
| 7,518,080 B2 | 4/2009 | Amato |
| 7,602,938 B2 | 10/2009 | Proloski |
| 7,674,995 B2 | 3/2010 | Desprez et al. |
| 7,676,433 B1 | 3/2010 | Ross et al. |
| 7,680,306 B2 | 3/2010 | Boutant |
| 7,720,256 B2 | 5/2010 | Desprez et al. |
| 7,726,457 B2 * | 6/2010 | Maier .................... B65H 15/00 194/206 |
| 7,726,548 B2 | 6/2010 | DeLaVergne |
| 7,748,029 B2 | 6/2010 | Ross |
| 7,822,263 B1 | 10/2010 | Prokoski |
| 7,834,289 B2 | 11/2010 | Orbke |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di Venuto |
| 8,180,667 B1 | 5/2012 | Baluja et al. |
| 8,194,938 B2 | 6/2012 | Wechsler et al. |
| 8,316,418 B2 | 11/2012 | Ross |
| 8,374,399 B1 * | 2/2013 | Talwerdi ................. G07D 7/121 382/112 |
| 8,374,920 B2 | 2/2013 | Hedges et al. |
| 8,391,583 B1 | 3/2013 | Mennie et al. |
| 8,428,772 B2 | 4/2013 | Miette |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig |
| 8,526,743 B1 | 9/2013 | Campbell et al. |
| 8,774,455 B2 | 7/2014 | Elmenhurst et al. |
| 9,031,329 B1 | 5/2015 | Farid et al. |
| 9,058,543 B2 | 6/2015 | Campbell |
| 9,152,862 B2 | 10/2015 | Ross |
| 9,170,654 B2 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,507 B1 | 6/2016 | Hoyos et al. |
| 9,361,596 B2 | 6/2016 | Ross et al. |
| 9,443,298 B2 | 9/2016 | Ross et al. |
| 9,558,463 B2 | 1/2017 | Ross et al. |
| 9,646,206 B2 | 5/2017 | Ross et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,540,664 B2 | 1/2020 | Ross et al. |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0168090 A1 | 11/2002 | Bruce et al. |
| 2003/0015395 A1 * | 1/2003 | Hallowell ................ G07D 7/00 194/206 |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0138128 A1 | 7/2003 | Rhoads |
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |

(56) References Cited

U.S. PATENT DOCUMENTS

| | | |
|---|---|---|
| 2004/0218801 A1 | 11/2004 | Houle et al. |
| 2005/0007776 A1 | 1/2005 | Monk et al. |
| 2005/0038756 A1 | 2/2005 | Nagel |
| 2005/0065719 A1 | 3/2005 | Khan et al. |
| 2005/0086256 A1 | 4/2005 | Owens et al. |
| 2005/0119786 A1 | 6/2005 | Kadaba |
| 2005/0125360 A1 | 6/2005 | Tidwell et al. |
| 2005/0131576 A1 | 6/2005 | De Leo et al. |
| 2005/0137882 A1 | 6/2005 | Cameron et al. |
| 2005/0160271 A9 | 7/2005 | Brundage et al. |
| 2005/0169529 A1* | 8/2005 | Owechko ............... G06K 9/469 |
| | | 382/190 |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0008377 A1 | 1/2008 | Andel et al. |
| 2008/0011841 A1 | 1/2008 | Self et al. |
| 2008/0128496 A1 | 6/2008 | Bertranou et al. |
| 2008/0130947 A1 | 6/2008 | Ross et al. |
| 2008/0219503 A1 | 9/2008 | Di Venuto et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1* | 11/2008 | Bennett .................. B07C 3/02 |
| | | 209/584 |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos dos Santos |
| 2009/0271029 A1 | 10/2009 | Doutre |
| 2009/0287498 A2 | 11/2009 | Choi |
| 2009/0307005 A1 | 12/2009 | O'Martin et al. |
| 2010/0027834 A1 | 2/2010 | Spitzig et al. |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0064279 A1* | 3/2011 | Uno ........................ G07D 7/12 |
| | | 382/112 |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1* | 11/2011 | Goldman .............. G06Q 10/107 |
| | | 340/568.1 |
| 2012/0042171 A1 | 2/2012 | White et al. |
| 2012/0130868 A1 | 5/2012 | Loken |
| 2012/0185393 A1 | 7/2012 | Atsmon et al. |
| 2012/0199651 A1 | 8/2012 | Glazer |
| 2012/0250945 A1 | 10/2012 | Peng et al. |
| 2013/0212027 A1 | 8/2013 | Sharma et al. |
| 2013/0214164 A1* | 8/2013 | Zhang ...................... G01J 3/36 |
| | | 250/339.14 |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0184843 A1 | 9/2014 | Campbell et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1* | 3/2015 | Ross ..................... G06K 9/3216 |
| | | 713/176 |
| 2015/0078629 A1 | 3/2015 | Gottemukkula et al. |
| 2015/0086068 A1 | 3/2015 | Mulhearn et al. |
| 2015/0127430 A1 | 5/2015 | Hammer, III |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2016/0034914 A1 | 2/2016 | Gonen et al. |
| 2016/0055651 A1 | 2/2016 | Oami |
| 2016/0117631 A1 | 4/2016 | McCloskey et al. |
| 2016/0180546 A1 | 6/2016 | Kim et al. |
| 2016/0189510 A1* | 6/2016 | Hutz .................. G08B 21/0277 |
| | | 340/541 |
| 2017/0032285 A1 | 2/2017 | Sharma et al. |
| 2017/0132458 A1 | 5/2017 | Short et al. |
| 2017/0243232 A1 | 8/2017 | Ross et al. |
| 2017/0243233 A1 | 8/2017 | Land et al. |
| 2017/0253069 A1* | 9/2017 | Kerkar ................... B42D 25/29 |
| 2017/0295301 A1* | 10/2017 | Liu ........................... G06T 7/70 |
| 2017/0300905 A1 | 10/2017 | Withrow et al. |
| 2017/0344823 A1 | 11/2017 | Withrow et al. |
| 2017/0344824 A1 | 11/2017 | Martin |
| 2017/0372327 A1 | 12/2017 | Withrow |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034694 A1 | 1/2019 | Ross |
| 2019/0102873 A1 | 4/2019 | Wang et al. |
| 2019/0228174 A1 | 7/2019 | Withrow et al. |
| 2019/0287118 A1 | 9/2019 | Ross et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Ross et al. |

FOREIGN PATENT DOCUMENTS

| | | |
|---|---|---|
| EP | 0759596 A2 | 2/1997 |
| EP | 1016548 A2 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3249581 A1 | 11/2017 |
| GB | 2097979 A | 11/1982 |
| GB | 2482127 A | 1/2012 |
| JP | S61234481 A | 10/1986 |
| JP | 2007213148 A | 8/2007 |
| WO | WO2005086616 A2 | 9/2005 |
| WO | WO2006038114 A1 | 4/2006 |
| WO | WO2007028799 A1 | 3/2007 |

(56) References Cited

FOREIGN PATENT DOCUMENTS

| WO | WO2007031176 A1 | 3/2007 |
|---|---|---|
| WO | WO2007071788 A1 | 6/2007 |
| WO | WO2007090437 A1 | 8/2007 |
| WO | WO2007144598 A1 | 12/2007 |
| WO | WO2009030853 A1 | 3/2009 |
| WO | WO2009089126 A1 | 7/2009 |
| WO | WO2009115611 A2 | 9/2009 |
| WO | WO2010018464 A2 | 2/2010 |
| WO | WO2012145842 A1 | 11/2012 |
| WO | WO2013126221 A1 | 8/2013 |
| WO | WO2013173408 A1 | 11/2013 |
| WO | WO2015004434 A1 | 1/2015 |
| WO | WO2016081831 A1 | 5/2016 |

OTHER PUBLICATIONS

U.S. Appl. No. 14/290,653, filed May 29, 2014, Document Fingerprinting.
U.S. Appl. No. 14/531,307, filed Nov. 3, 2017, Digital Fingerprinting Track and Trace System.
U.S. Appl. No. 14/531,724, filed Nov. 3, 2014, Digital Fingerprinting Object Authentication and Anti-Counterfeiting System.
U.S. Appl. No. 15/862,556, filed Jan. 4, 2018, Database for Detecting Counterfeit Items Using Digital Fingerprint Records.
U.S. Appl. No. 15/044,034, filed Feb. 15, 2016, Document Authentication Using Extracted Digital Fingerprints.
U.S. Appl. No. 15/208,339, filed Jul. 12, 2016, Database for Detecting Counterfeit Items Using Digital Fingerprint Records.
U.S. Appl. No. 16/041,710, filed Jul. 20, 2018, Authentication of a Suspect Object Using Extracted Native Features.
U.S. Appl. No. 13/618,362, filed Sep. 12, 2012, Object Identification and Inventory Management.
U.S. Appl. No. 14/841,359, filed Aug. 31, 2015, Object Identification and Inventory Management.
U.S. Appl. No. 15/436,616, filed Feb. 17, 2017, Preserving Authentication Under Item Change.
U.S. Appl. No. 15/436,631, filed Feb. 17, 2017, Personal History in Track and Trace System.
U.S. Appl. No. 16/029,515, filed Jul. 6, 2018, Personal History in Track and Trace System.
U.S. Appl. No. 15/436,646, filed Feb. 17, 2017, Preserving a Level of Confidence of Authenticity of an Object.
U.S. Appl. No. 15/436,656, filed Feb. 17, 2017, Multi-Level Authentication.
U.S. Appl. No. 15/490,774, filed Apr. 18, 2017, Authentication-Triggered Processes.
U.S. Appl. No. 15/600,566, filed May 19, 2017, Controlled Authentication of Physical Objects.
U.S. Appl. No. 15/672,182, filed Aug. 8, 2017, Event-Driven Authentication of Physical Objects.
U.S. Appl. No. 15/635,040, filed Jun. 27, 2017, Centralized Databases Storing Digital Fingerprints of Objects for Collaborative Authentication.
U.S. Appl. No. 15/641,157, filed Jul. 3, 2017, Authenticated Production.
U.S. Appl. No. 15/649,567, filed Jul. 13, 2017, Database Records and Processes to Identify and Track Physical Objects During Transportation.
U.S. Appl. No. 16/045,642, filed Jul. 25, 2018, Model-Based Digital Fingerprinting.
Extended European Search Report, dated Jan. 3, 2018, for European Application No. 17186959.7-1901, 11 pages.
Shi et al., "Smart Cameras: Fundamentals and Classification," Chapter 2, in Belbachir (ed.), Smart Cameras, Springer, New York, New York, USA, 2010, pp. 19-34.
Farid, "Digital Image Forensics," Dartmouth CS 89/189, Sprint 2013, 199 pages.

Huang et al., "A Novel Binarization Algorithm for Ballistic Imaging Systems," 3rd International Congress on Image and Signal Processing, Yantai, China, Oct. 16-18, 2010, pp. 1287-1291.
Huang et al., "An Online Ballistics Imaging System for Firearm Identification," 2nd International Conference on Signal Processing Systems, Dalian, China, Jul. 5-7, 2010, vol. 2, pp. 68-72.
Li, "Firearm Identification System Based on Ballistics Image Processing," Congress on Image and Signal Processing, School of Computer and Information Science, Faculty of Computing, Health and Science Edith Cowan University, Mount Lawley, WA, Perth, Australia pp. 149-154.
Online NCOALink® Processing Acknowledgement Form (PAF) Released by Lorton Data, Jun. 2, 2009, URL=http://us.generation-nt.com/online-ncoalink-processing-acknowledgement-form-paf-released-by-press-1567191.html, download date Jun. 25, 2010, 2 pages.
Smith, "Fireball: A Forensic Ballistic Imaging System: Proceedings of the 31st Annual International Carnahan Conference on Security Technology," Canberra, Australia, Oct. 15-17, 1997, pp. 64-70.
United States Postal Service, "NCOALink® Systems," URL=https://web.archive.org/web/20100724142456/http://www.usps.com/ncsc/addressservices/moveupdate/changeaddress.htm, download date Jun. 23, 2010, 2 pages.
United States Postal Service Publication 28 "Postal Addressing Standards", dated Jul. 2008; text plus Appendix A only; 55 pages.
Boa et al., "Local Feature based Multiple Object Instance Identification using Scale and Rotation Invariant Implicit Shape Model," 12th Asian Conference on Computer Vision, Singapore, Nov. 1-5, 2014, pp. 600-614.
Beekhof et al., "Secure Surface Identification Codes," Proceeding of the SPIE 6819: Security Forensics, Steganography, and Watermarking of Multimedia Contents X:68190D, 2008. (12 pages).
Buchanan et al., "Fingerprinting documents and packaging," Nature 436 (7050): 475, 2005.
Di Paola et al., "An Autonomous Mobile Robotic System for Surveillance of Indoor Environments," International Journal of Advanced Robotic Systems 7(1): 19-26, 2010.
Fischler et al., "Random Sample Consensus: A Paradigm for Model Fitting with Applications to Image Analysis and Automated Cartography," Communication of the ACM 24(6); 381-395, 1981.
Kartik et al., "Security System with Face Recognition, SMS Alert and Embedded Network Video Monitoring Terminal," International Journal of Security, Privacy and Trust Management 2(5):9-19, 2013.
Li, "Image Processing for the Positive Identification of Forensic Ballistics Specimens," Proceedings of the 6th International Conference of Information Fusion, Cairns, Australia, Jul. 8-11, 2003, pp. 1494-1498.
Maddern et al., "Illumination Invariant Imaging: Applications in Robust Vision-based Localization, Mapping and Classification for Autonomous Vehicles," IEEE International Conference on Robotics and Automation, Hong Kong, China, May 31-Jun. 7, 2014, 2014, 8 pages.
Matsumoto et al., "Nano-artifact metrics based on random collapse of resist," Scientific Reports 4:6142, 2014 (5 pages).
Rublee et al., "ORB: an efficient alternative to SIFT or SURF," IEEE International Conference on Computer Vision, Barcelona, Spain, Nov. 6-13, 2011, 8 pages.
Schneider et al., "A Robust Content Based Digital Signature for Image Authentication," Proceeding of the International Conference on Image Processing Lausanne, Switzerland, Sep. 19, 1996, pp. 227-230.
Takahashi et al., Mass-produced Parts Traceability System Based on Automated Scanning of "Fingerprint of Things," 15th IAPR International Conference on Machine Vision Applications, Nagoya, Japan, May 8-12, 2017, 5 pages.
Veena et al., "Automatic Theft Security System (Smart Surveillance Camera)," Computer Science & Information Technology 3:75-87, 2013.
United States Postal Services, NCOALink® Systems, dated May 27, 2009, URL=http://ribbs.usps.gov/ncoalink/ncoalink_print.htm, download date Jun. 23, 2010, 3 pages.

(56) References Cited

OTHER PUBLICATIONS

Ebay, "eBay Launches Must-Have IPhone App Red Laser 3.0" published Nov. 18, 2011; https://www.ebayinc.com/stories/news/ebay-launches-must-have-iphone-app-redlaser-30/, downloaded Mar. 21, 2019, 7 pages).

Shields, "How to Shop Savvy With Red Laser," published online on Mar. 22, 2010; https://iphone.appstornn.net/reviews/lifestyle/how-to-shop-savvy-with-redlaser/, downloaded Mar. 22, 2010, 8 pages).

Entrupy.com Website History, Wayback Machine; https://web.archive.org/web/20160330060808/https://www.entrupy.com/; Mar. 30, 2016 (Year: 2016), 2 pages.

Anonymous, "Intrinsic Characteristics for Authentication" & "AlpVision Advances Security Through Digital Technology," Authentication News vol. 12, (No. 9) pp. 2, 7 and 8, dated Sep. 2006, 3 pages total.

Mistry et al., "Comparison of Feature Detection and Matching Approaches: SIFT and SURF," Global Research and Development Journal for Engineering, vol. 2, Issue 4, Mar. 2017, 8 pages.

Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.

Drew, M. S., et al., "Sharpening from Shadows: Sensor Transforms for Removing Shadows using a Single Image," Color and Imaging Conference, vol. 5, Society for Imaging Science and Technology, 2009, pp. 267-271.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

\* cited by examiner

FIG. 6A
FIG. 6B
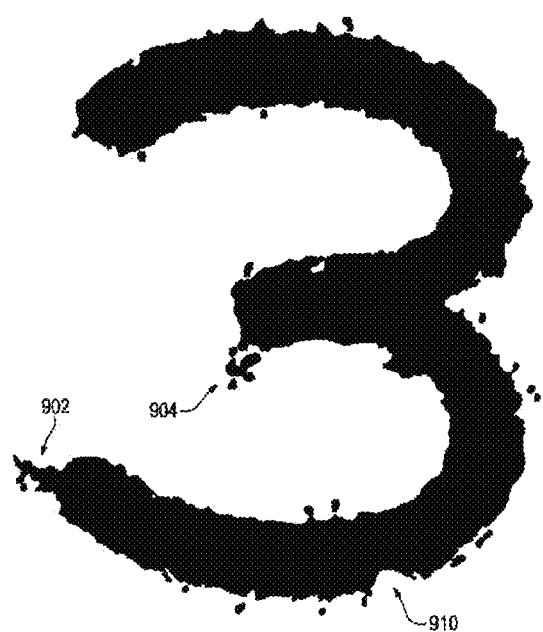

FIG. 7A
FIG. 7B
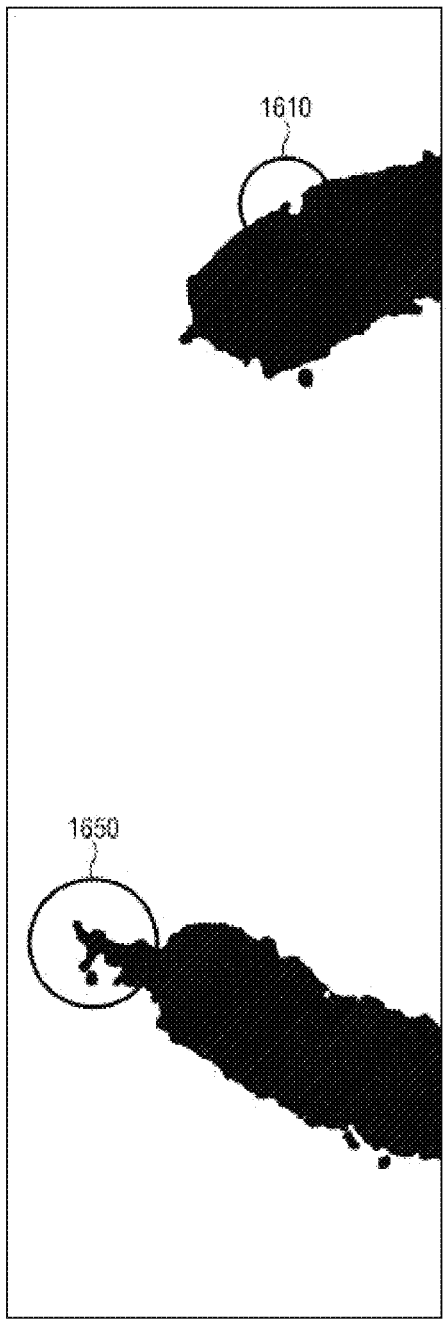
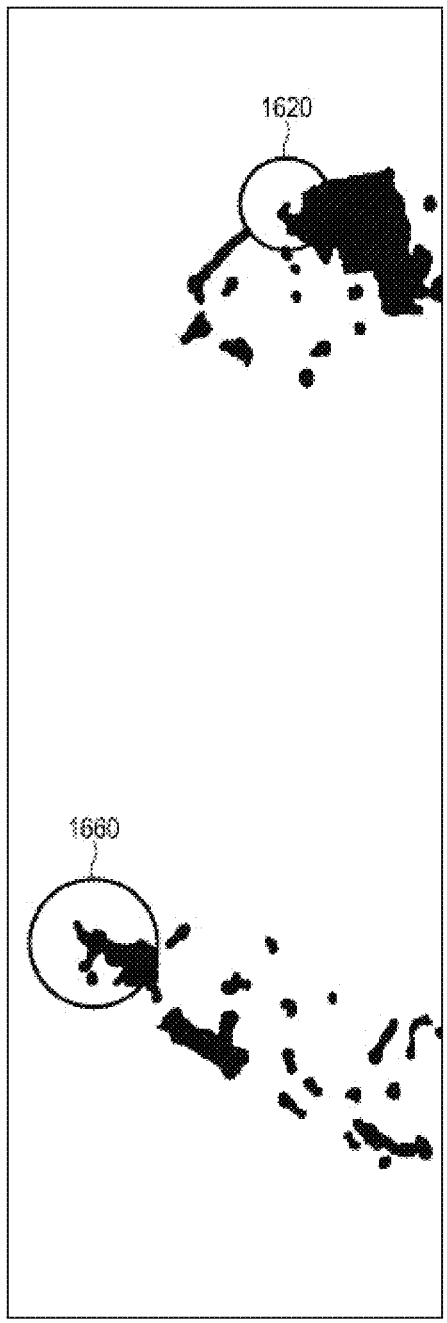

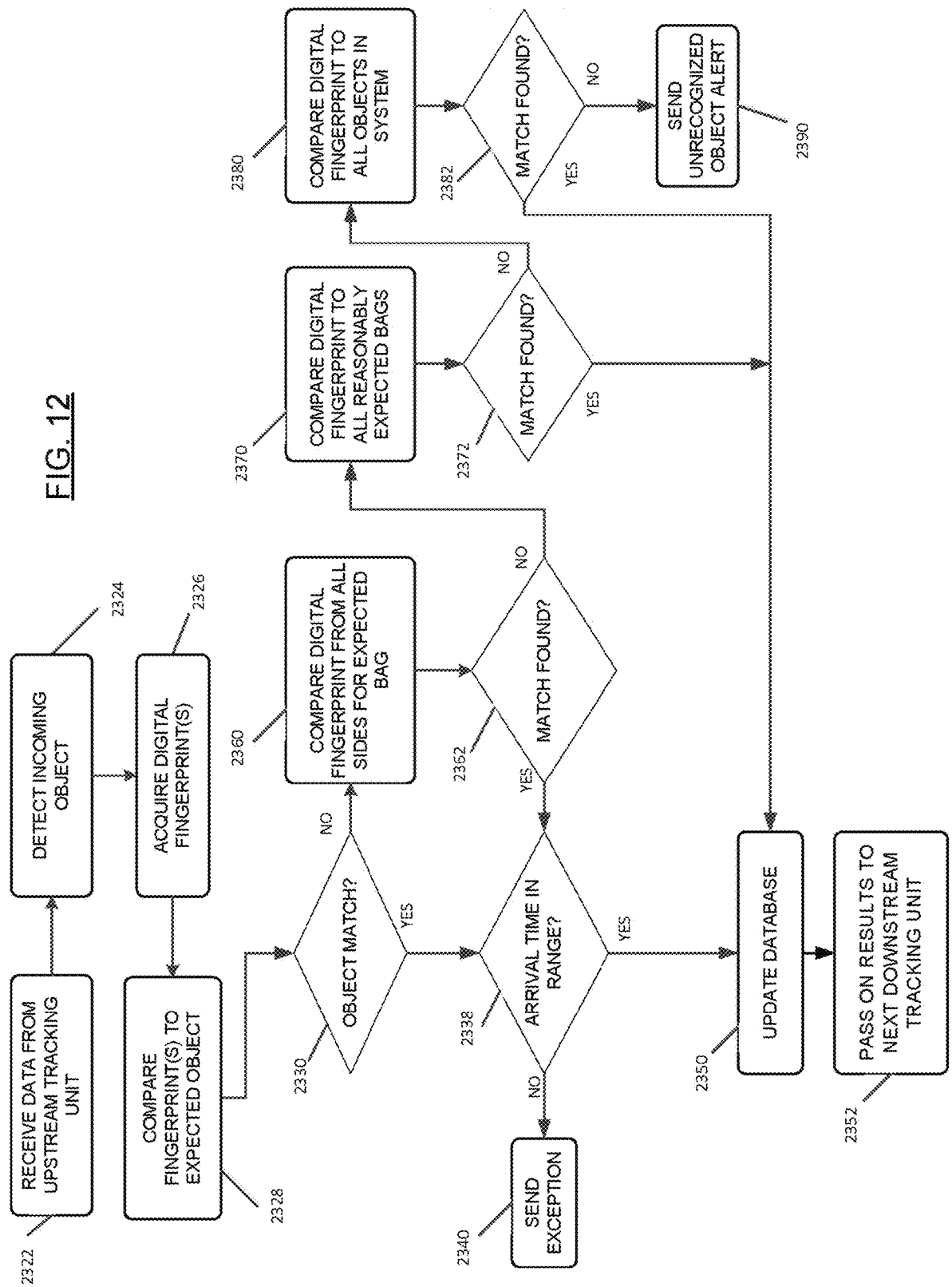

AUTHENTICATION-BASED TRACKING

PRIORITY CLAIM

This application is a non-provisional of, and claims priority pursuant to 35 U.S.C. § 119(e) (2012) to U.S. provisional application No. 62/377,436 filed Aug. 19, 2016, hereby incorporated by reference as though fully set forth.

COPYRIGHT NOTICE

COPYRIGHT© 2016-2017 Alitheon, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d) (2017).

TECHNICAL FIELD

Centralized databases storing digital fingerprints of physical objects enabling continuous authentication-integrated tracking with enhanced security, rapid searching, and high reliability. Methods and apparatus to identify, track, and authenticate any physical object utilizing a suitable database.

BACKGROUND

Many different approaches are known to uniquely identify and track physical objects, including labeling and tagging strategies using serial numbers, barcodes, holographic labels, RFID tags, and hidden patterns using security inks or special fibers. All currently known methods rely on applied identifiers that are extrinsic to the object and, as such, may fail to detect introduction of counterfeit or otherwise unknown objects. In addition, many applied identifiers add substantial costs to the production and handling of the objects sought to be identified or authenticated. Applied identifiers, such as labels and tags, are also at themselves at risk of being damaged, lost, stolen, duplicated, or otherwise counterfeited.

SUMMARY OF THE PRESENT DISCLOSURE

The following is a summary of the present disclosure in order to provide a basic understanding of some features and context. This summary is not intended to identify key or critical elements of the disclosure or to delineate the scope of the disclosure. Its sole purpose is to present some concepts of the present disclosure in simplified form as a prelude to a more detailed description that is presented later.

There are many known approaches to establishing or reestablishing the authenticity of an object, including secure supply chains, expert assessment, and counterfeit detection. There are also many known methods to tracking the location of physical objects. What is lacking, however, and is provided by the present disclosure, is the ability to integrate digital fingerprint authentication-based identification and location tracking into a single continuous process in which an authentication-integrated tracking system is simultaneously aware of the identity and location of one or more physical objects at all times and, further, in which rapid reestablishment and continuation of authentication-integrated tracking is possible in the event of any temporary interruption or failure of tracking.

Additional aspects and advantages of this disclosure will be apparent from the following detailed description of preferred embodiments, which proceeds with reference to the accompanying drawings.

BRIEF DESCRIPTION OF THE DRAWINGS

In order to describe the manner in which the above-recited and other advantages and features of the present disclosure can be obtained, a more particular description follows by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which:

FIG. 6A shows the same dollar bill image as in FIG. 4A, juxtaposed with FIG. 6B for comparison.

FIG. 6B shows an image of the numeral "3" that has been damaged or degraded.

FIG. 7A shows detail of two fingerprint feature locations on the numeral 3.

FIG. 7B shows detail of the damaged bill with the corresponding fingerprint feature locations called out for comparison.

FIG. 12 is a simplified flow diagram of selected aspects of operation of a tracking unit to realize positive control of objects.

DETAILED DESCRIPTION OF PREFERRED EMBODIMENTS

Figure 1:
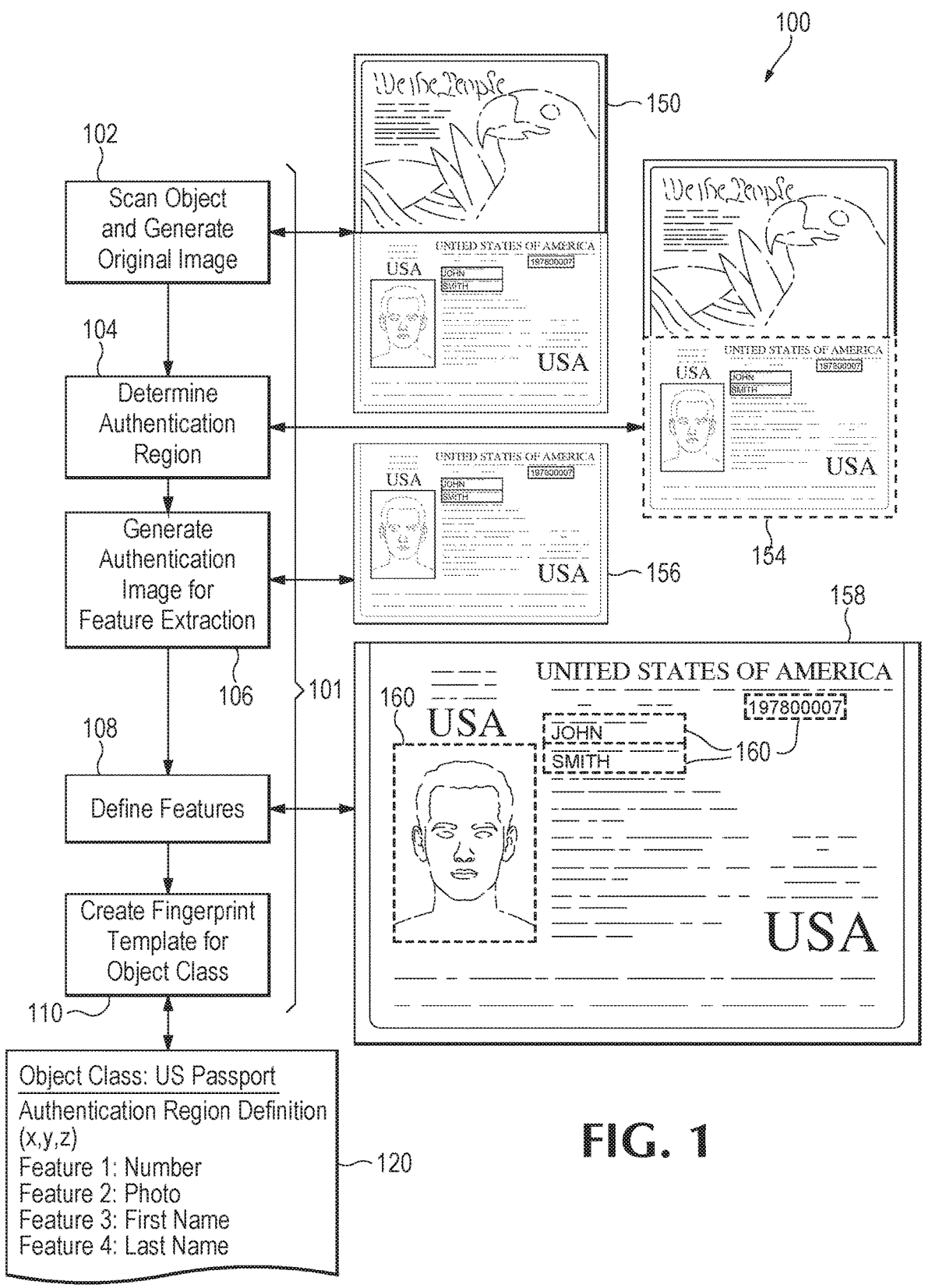
FIG. 1 is an example of an authentication region and fingerprint template definition for a U.S. passport.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first machine could be termed a second machine, and, similarly, a second machine could be termed a first machine, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purposes of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed objects. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The methods described in the present disclosure enable the identification of an object without the need for attaching, applying, or associating physical tags or other extrinsic identifying materials with the object. A system does this by creating a unique digital signature for the object, which is referred to as a digital fingerprint. Digital fingerprinting utilizes the structure of the object, including random and/or deliberate features created, for example, during manufacturing or use of the object, to generate a unique digital signature for that object—similar to the way in which a human fingerprint references the friction ridges on a finger. Also, like a human fingerprint, the digital fingerprint can be stored and retrieved to identify objects at a later time.

Eliminating the need to add extrinsic identifiers or any physical modifications to an object offers a number of advantages to manufacturers, distributors, buyers, sellers, users, and owners of goods. Forgoing the addition of extrinsic identifiers reduces the cost of manufacturing and offers greater security than physical tagging. Moreover, physical identifiers can be damaged, lost, modified, stolen, duplicated, or counterfeited whereas digital fingerprints cannot.

Unlike prior art approaches that simply utilize a comparison of pixels, a system in accordance with the present disclosure utilizes the extraction of features to identify and authenticate objects. Feature extraction enables users to take a large amount of information and reduce it to a smaller set of data points that can be processed more efficiently. For example, a large digital image that contains tens of thousands of pixels may be reduced to a few locations of interest that can be used to identify an object. This reduced set of data is called a digital fingerprint. The digital fingerprint contains a set of fingerprint features or locations of interest which are typically stored as feature vectors. Feature vectors make image processing more efficient and reduce storage requirements as the entire image need not be stored in the database, only the feature vectors need to be stored. Examples of feature extraction algorithms include—but are not limited to—edge detection, corner detection, blob detection, wavelet features, Gabor, gradient and steerable output filter histograms, scale-invariant feature transformation, active contours, shape contexts, and parameterized shapes.

While the most common applications of the system may be in the authentication of physical objects such as manufactured goods and documents, the system is designed to be applicable to any object that can be identified, characterized, quality tested, or authenticated with a digital fingerprint. These include but are not limited to mail pieces, parcels, art, coins, currency, precious metals, gems, jewelry, apparel, mechanical parts, consumer goods, integrated circuits, firearms, pharmaceuticals, and food and beverages. Here the term "system" is used in a broad sense, including the methods of the present disclosure as well as apparatus arranged to implement such methods.

The modern-day demand for increasingly higher levels of security along transportation and distribution networks calls for equally modern tracking systems that have continuous knowledge of the identity and location of each tracked object. In order to secure transportation of an object to the maximum extent, a tracking system must be resilient to the removal or insertion of an object, or the substitution of one object for another (i.e. changing the identity of an object in the system). In addition, if tracking information is lost (e.g. during a system shutdown) as may occur from time to time in even the most robust systems, a secure system should be able to reestablish tracking as soon as possible, preferably automatically. Current approaches do not simultaneously know the location and identity of each tracked object and many lack robustness against stoppages, movement of objects on the transport system, adulteration or substitution of one object for another, and other common failures.

Track and Trace.

Many current technologies have the ability to determine that an object is, or is likely to be, at a particular location along a conveyor system. The simplest (and still among the most common) are electric eyes that detect a laser beam being broken. Other methods are even more general. The baggage transport system at Seattle-Tacoma International Airport ("Sea-Tac"), for example, counts the steps on the stepper motors that drive each of the conveyors along the transport path and, through a series of calculations, determines where a bag placed on the conveyor system at one place has been conveyed to. The system couples the stepper-motor tracking with electric eyes to determine when to switch a bag from one conveyor to another, for example with diverter gates, in order to convey the bag to its designated destination.

Some forms of tracking incorporate primitive forms of item identification. All such identification is derivative in nature—that is, it represents proxy identification at best, as will be described. Referring again to the Sea-Tac system, bags have identifying tags applied at check-in and, occasionally, along their paths to the airplane have those tags read by a barcode reader and identification is based on the assumption that the bag tag, or other identification proxy, remains attached to the same object it was originally affixed to.

None of these methods, however, maintain continuous awareness of both the identity and location of the object. The taught system, as presented below, does both. Existing systems do not maintain continuous awareness of both the identity and location of a transported object because they, in general, have only sporadic information on where the object is in fact located. This sporadic information may include check-i when the object passes an electric eye, or when the object is scanned by a barcode reader. The rest of the time the object's location is approximated or estimated through calculated assumptions (often erroneous) that the object is where the belt-tracking system projects that it is.

Further, the currently available technology does not have the ability to identify the object itself. Some approaches may appear to do so. The barcode readers may, for example, determine that an object bearing a specific barcode passed its location at a specific time. However, identifying an applied barcode or other identification proxy is much less secure than identifying the object to which it is attached. Proxy identification, as well as any proxy-associated security, is highly vulnerable to circumvention by, for example, taking a tag from one bag and placing it on another (say one with dangerous contents), or by creating a different tag with the same barcode, or by simply removing, damaging, or otherwise altering the tag.

Moreover, existing systems do not continuously track conveyed objects. Even where there is a laser or a camera for reading, say, a barcode, the field of view is limited to a small section of a conveyor. Current systems do not offer continuous, uninterrupted control because the fields of view during which objects are being identified (typically indirectly by proxy) do not overlap, leaving gaps between identifications where there is no control.

Commonly, such current systems have security cameras in place. Sometimes, all parts of the system are visible to a security camera. However, these cameras are not part of a system of location and identity control. The cameras either require a person to monitor them to look for jams or unauthorized interference or use of them is made only retroactively for information regarding past occurrences.

In other words, the components of current systems that are able to detect an object can only do so by proxy (e.g. the barcode readers) or locally (e.g. the electric eyes), while the components that can (collectively) see the entire system (e.g. the security cameras) are not capable of identifying objects or tracking them individually or continuously.

Identification.

Identification is the process of determining which object is or is most likely the one under inspection. Implicit is the detection that there is (or is supposed to be) an item present. Current systems generally cannot identify an object directly at all. Current systems may infer an object's identity by, for example, the fact that the object occupies a location on a conveyor belt at which location an object was placed at an earlier time, by assuming the object is the same object as originally placed on that location and that it has not been replaced or interfered with. On the other hand, they may infer its identity by proxy as is the case with the barcode or RFID tags placed on luggage.

In prior art, from check-in to baggage claim pickup, a piece of luggage is never positively and directly identified at any time. Apparatus and technology disclosed herein address that problem.

This disclosure, in one aspect, describes a method and technology for ensuring positive control of items on assembly lines, conveyors or other means of transport or distribution. We define "positive control" to mean that the system must have continuous knowledge of the identity of each tracked object and of the location of each tracked object. Further, in the event of loss of positive control, such a system must be capable of rapid reestablishment of positive control, preferably automatic. Current technologies meet none of these requirements. The taught system meets all of them.

In one aspect, the present disclosure integrates into one action the ascertaining of the location of an object and the positive identification of that object. The present disclosure thus differs from current technologies that solve part, but not all, of the problems solved by the present disclosure.

Below reference will be made to baggage conveyor systems. Such references are merely examples of a system on which the taught disclosure may operate. References to that system is not designed to be limiting of the taught technology.

In some other aspects, the present disclosure teaches a series of technologies that merge object identification and object tracking to provide positive control of objects at all times. It enables at least the following capabilities and:

(1) Tracking. An object is continuously tracked, unless system failure occurs (see below).

(2) Identification. The disclosed system has the capability to continuously identify individual objects as they move along in a physical conveyance system so as to confirm that the object being tracked is the object that is supposed to be tracked. In other words, the system is robust against substitution of one object (even an object that has the same serialization and that looks just like the original object) for another. Together, continuous tracking and continuous identification provide continuous positive control.

(3) Restoration of positive control after system problems. Because the system of the present disclosure "knows" both where an object is supposed to go and which objects are presented to the tracking devices, it can with minimal or no human intervention direct the object toward its intended destination even when the tracking system shuts down entirely. The taught system has three major components:

An illustrative system may include a set of tracking units (TUs), capable of recovery from loss of tracking as further explained below. Preferably, a set of methods associated with each tracking unit realizes identifying the objects it sees.

A tracking and identification database and system generally consists of one or more networked tracking units. These tracking units may have scanners configured to capture images of a specified area in a facility. In general, the units are designed to work together to cover a broader specified area of the facility where items to be tracked are typically found. There may be areas in this broader area that are not covered by imagers (such as inside X-ray inspection machines) but where the items are under some other kind of positive control. To help in tracking the objects, images of the objects are captured and may be used directly for tracking and/or for extracting digital fingerprints for identifying the objects in view. The tracking units may compare those digital fingerprints with a previously-created reference database to identify the items being tracked and/or they may add the digital fingerprints to such a database for use by downstream systems. A reference database system (illustrated at 1170 in FIG. 11 in one example) may be used to store data, update and query the reference database. The reference database system may access one or more reference databases to support and coordinate some operations of the tracking units. Additional functions of a reference database system are described below.

The system described does not depend on the particulars of any of these system components. Though both tracking and identification will generally be done with cameras (for example), all means of acquiring data about an item and using that data to determine its movements is in view in this description provided such methods are consistent with the need to provide concurrent object identification.

Scanning

In this application, the term "scan" is used in the broadest sense, referring to any and all means for capturing an image or set of images, which may be in digital form or transformed into digital form. Images may, for example, be two dimensional, three dimensional, or in the form of a video. Thus a "scan" may refer to an image (or digital data that defines an image) captured by a scanner, a camera, a specially adapted sensor or sensor array (such as a CCD array), a microscope, a smartphone camera, a video camera, an x-ray machine, a sonar, a radar, a lidar, an ultrasound machine, a microphone (or other instruments for converting sound waves into electrical energy variations), etc. Broadly, any device that can sense and capture either electromagnetic radiation or mechanical wave that has traveled through an object or reflected off an object or any other means to capture surface or internal structure of an object is a candidate to create a "scan" of an object. Various means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure. Similarly, terms such as "scanner" and "scanning equipment" herein may be used in a broad sense to refer to any equipment or capture devices capable of carrying out "scans" as defined above, or to equipment that carries out "scans" as defined above as part of their function.

Authenticating

In this application, different forms of the words "authenticate" and "authentication" will be used broadly to describe both authentication and attempts to authenticate which comprise creating a digital fingerprint of the object. Therefore, "authentication" is not limited to specifically describing successful matching of inducted objects or generally describing the outcome of attempted authentications. As one example, a counterfeit object may be described as "authenticated" even if the "authentication" fails to return a matching result. In another example, in cases where unknown objects are "authenticated" without resulting in a match and the authentication attempt is entered into a database for subsequent reference the action described as "authentication" or "attempted authentication" may also, post facto, also be properly described as an "induction". An authentication of an object may refer to the induction or authentication of an entire object or of a portion of an object.

Authentication Regions

Because digital fingerprinting works with many different types of objects, it may be useful to define what regions of digital images of objects are to be used for the extraction of features for authentication purposes. The chosen regions may vary for different classes of objects. In some embodiments, a chosen region may be the image of the entire object; in other embodiments chosen regions may be one or more sub-regions of the image of the object.

For instance, in the case of a photograph, a digital image of the entire photograph may be chosen for feature extraction. Each photograph is different and there may be unique feature information anywhere in a photograph. In such a case, the authentication region may be the entire photograph.

In some embodiments, multiple regions may be used for fingerprinting. In some examples, there may be several regions where significant variations take place among different similar objects that need to be distinguished while, in the same objects, there may be regions of little significance. In other examples, a template may be used (see FIG. 1) to define regions of interest, including elimination of regions of little interest.

In one embodiment, an object, such as a bank note, may be deemed authenticated if a few small arbitrary regions scattered across the surface are fingerprinted, possibly combined with one or more recognitions of, for example, the contents of a region signifying the value of the bank note or one containing the bank note serial number. In such examples, the fingerprints of any region (along with sufficient additional information to determine the bank note value and its purported identity) may be considered sufficient to establish the authenticity of the bill. In some embodiments, multiple fingerprinted regions may be referenced in cases where one or more region may be absent from an object (through, for example, tearing) when, for example, a bank note is presented for authentication. In other embodiments, however, all regions of an object may need to be authenticated to ensure an object is both authentic and has not been altered.

In one embodiment, a passport may provide an example of feature extractions from multiple authentication regions. In the case of a passport, features chosen for authentication may be extracted from regions containing specific identification information such as the passport number, the recipient name, the recipient photo, etc., as illustrated in FIG. 1. In some examples, a user may define a feature template specifying the regions whose alteration from the original would invalidate the passport, such as the photo, identifying personal data, or other regions considered important by the user. More details of feature templates are given in Ross, et at. U.S. Pat. No. 9,443,298.

FIG. 1 illustrates one example of an authentication region and a fingerprint template definition for a U.S. passport. In this figure, brace 101 refers to a simplified flow diagram of a process as follows: At process block 102, an object is scanned to generate an "original image", that is, a digital image file or a digital data file in any suitable format that is herein simply referred to as an "image". The original image is illustrated as the data page spread of a U.S. passport book, at block 150.

Next, the system processes the image data to determine an authentication region. In this example, the authentication region is the biographic data page of the U.S. Passport, located in the lower portion of image 150, identified by dashed box 154. Next, the process generates an authentication image for feature extraction, block 106. The authentication image is illustrated at reference 156. Next, at block 108, the process defines one or more locations of interest for feature vector extraction. The locations of interest in this example are, as shown in image 158 by dashed boxes 160, the surname, the given name, the passport number, and the passport photo.

Finally, at block 110, the process 100 comprises creating a fingerprint template 120. In this example, template 120 identifies an object class (U.S. Passport), defines an authentication region (for example, by X-Y coordinates), and lists one or more locations of interest within that authentication region. In this instance, the list comprises passport number, photo, first name, and last name.

In some embodiments, an ability to define and store optimal authentication regions for classes of objects may offer benefits to a user. In some embodiments, it may be preferable to scan limited regions of objects rather than to scan entire objects. For instance, in the case of an article of designer clothing, scanning limited area, such as a clothing label, for feature vectors to generate a digital fingerprint may be preferable to scanning an entire garment. Further, defining such regions may enable detection of partial alteration of an object.

Once an authentication region is defined, specific applications may be created for different markets or classes of objects that may assist users in locating and scanning an optimal authentication region. In some embodiments, for example when utilizing a mobile device, a location box and crosshairs may automatically appear in the viewfinder of a smartphone camera application, to help the user center the camera on an authentication region, and automatically lock onto a region and complete a scan when the device is focused on an appropriate area. It should be noted that, although some examples suggested above are two-dimensional objects (passport, bank note), the present disclosure is fully applicable to three-dimensional objects as well. As previously noted, scanning may be of any kind, including 2-D, 3-D, stereoscopic, HD, etc. and is not limited to the use of visible light or to the use of light at all (as previously noted, sonar and ultrasound are, for example, appropriate scanning technologies).

In some embodiments, objects may have permanent labels or other identifying information attached to them. In addition to the objects themselves, these attachments may also be referenced as features for digital fingerprinting, particularly where the label or other identifying information becomes a permanent part of the object. In one example, a permanent label may be used as an authentication region for the object to which it is affixed. In another example, a label may be used in conjunction with the object itself to create a fingerprint of multiple authentication regions referencing both a label and an object to which the label is affixed.

In one example, wine may be put into a glass bottle and a label affixed to the bottle. Since it is possible that a label may be removed and re-applied elsewhere merely using the label itself as an authentication region may not be sufficient. In this case, the authentication region may be defined so as to include both a label and a substrate it is attached to—in this example some portion of a label and some portion of a glass bottle. This "label and substrate" approach may be useful in defining authentication regions for many types of objects, such as various types of goods and associated packaging. In other instances, authentication may reveal changes in the relative positions of some authentication regions such as in cases where a label has been moved from its original position, which may be an indication of tampering or counterfeiting. If an object has "tamper-proof" packaging, this may also be included in the authentication region.

In some embodiments, multiple authentication regions may be chosen from which to extract unique features. In a preferred embodiment, multiple authentication regions may be selected to enable the separate authentication of one or more components or portions of an object. For example, in one embodiment, features may be extracted from two different parts of a firearm. Both features may match the original firearm but since it is possible that both parts may have been removed from the original firearm and affixed to a weapon of different quality, it may also be useful to determine whether the relative positions of the parts have changed. In other words, it may be helpful to determine that the distance (or other characteristics) between Part A's authentication region and Part B's authentication region remains consistent with the original feature extraction. If the positions of Parts A and B are found to be consistent to the relative locations of the original authentication regions, the firearm may be authenticated. Specifications of this type may be stored with or as part of a digital fingerprint of an object.

Fingerprint Template Definition

In an embodiment, when a new type or class of object is being scanned into a system for the first time, the system can create a fingerprint template (see FIG. 1) that can be used to control subsequent authentication operations for that class of objects. This template may be created either automatically by the system or by a human-assisted process.

A fingerprint template is not required for the system to authenticate an object, as the system can automatically extract features and create a digital fingerprint of an object without it. However, the presence of a template may optimize the authentication process and add additional functionality to the system.

TABLE 1

Example Fingerprint Template.

CLASS:
[Description of the object]
United States Passport
AUTHENTICATION REGION:
[Description of the authentication regions for the object]
Region 1: (x1, y1, z1), (x2, y2, z2)
.
.
.
Region n
REGION MATCH LIST
[List of the regions that are required to match to identify an object]
Region List: 1 . . . n
FEATURES:
[Key features of the object]
Feature 1: Passport Number
Feature 2: Photo
Feature 3: First Name
Feature 4: Last Name
.
.
.
Feature n
METHODS:
[Programs that can be run on features of an object]
Feature 2:
Photo Method 1: [checkphoto.exe] Check for uneven edges indicating photo substitution
.
.
.
Method n
Feature n
Method n
ADDITIONAL DATA
[Additional data associated with the object]
Data 1: example data
.

TABLE 1-continued

Example Fingerprint Template.

.
.
.
Data n

The uses of the fingerprint template include but are not limited to determining the regions of interest on an object, the methods of extracting fingerprinting and other information from those regions of interest, and methods for comparing such features at different points in time. The name "fingerprint template" is not important; other data with similar functionality (but a different name) should be considered equivalent.

In an embodiment, four different but related uses for this technology are particularly in view in the present disclosure. These are illustrative but are not intended to be limiting of the scope of the disclosure. These applications may be classified broadly as (1) authentication of a previously scanned original, (2) detection of alteration of a previously scanned original, (3) detection of a counterfeit object without benefit of an original, and (4) assessing the degree to which an object conforms with a predetermined specification, such as a manufacturing specification or other applicable specification.

The uses of the fingerprint template include but are not limited to determining the regions of interest on an object, the methods of extracting fingerprinting and other information from those regions of interest, and methods for comparing such features at different points in time. The name "fingerprint template" is not important; other data with similar functionality (but a different name) should be considered equivalent.

In an embodiment, four different but related uses for this technology are particularly in view in the present disclosure. These are illustrative but are not intended to be limiting of the scope of the disclosure. These applications may be classified broadly as (1) authentication of a previously scanned original, (2) detection of alteration of a previously scanned original, (3) detection of a counterfeit object without benefit of an original, and (4) assessing the degree to which an object conforms with a predetermined specification, such as a manufacturing specification.

In example (1), an object is fingerprinted preferably during the creation process (or at any time when its provenance may be sufficiently ascertained) or at a point where an expert has determined its authenticity. Subsequently, the object is later re-fingerprinted, and the two sets of fingerprints are compared to establish authenticity of the object. The fingerprints may be generated by extracting a single fingerprint from the entire object or by extracting multiple sets of features from multiple authentication regions. Fingerprinting may also involve reading or otherwise detecting a name, number, or other identifying characteristics of the object using optical character recognition or other means which may be used to expedite or facilitate a comparison with other fingerprints. For instance, in cases where manufacturing (or other object) databases use serial numbers or other readable identifiers, such identifiers may be utilized to directly access the database record for the object and compare its digital fingerprint to the original that was previously stored, rather than searching an entire digital fingerprinting database for a match.

In case (2), a fingerprinted object is compared, region by region, with a digital fingerprint of an original object to detect low or nonexistent matching of the fingerprint features from those regions. While case (1) is designed to determine whether the original object is now present, case (2) is designed to detect whether the original object has been altered and, if so, how it has been altered. In some embodiments, authentication regions having poor or no matching fingerprint features will be presumed to have been altered.

In case (3), an object may not have been fingerprinted while its provenance was sufficiently ascertainable. One example would be bills or passports created prior to initiating the use of a digital fingerprinting system. In such examples, digital fingerprints of certain regions of interest on an object may be compared with digital fingerprints from known, or suspected, counterfeit objects or with both those and fingerprints of properly authenticated objects. In one example, a photograph may be spuriously added to a passport and, as an artifact of the counterfeiting, the edge of the added photo may tend to be sharper than an edge of an original, unaltered, photograph. In such a case, fingerprint characteristics of known authentic passports and those of passports that are known (or suspected to) have been altered by changing a photograph may be compared with the passport being inspected to estimate whether the passport exhibits indications of alteration.

Digital Fingerprint Generation

In an embodiment, once an object has been scanned and at least one authentication region has been identified, the digital image, which will be used to create the unique digital fingerprint for the object, is generated. The digital image (or set of images) provides the source information for the feature extraction process.

In the present disclosure, a digital fingerprinting feature is defined as a feature or a location of interest in an object, which feature is inherent to the object itself. In some embodiments, features preferably are a result of a manufacturing process, other external processes, or of any random, pseudo-random, or deliberate process or force, such as use. To give one example, gemstones have a crystal pattern which provides an identifying feature set. Every gemstone is unique and every gem stone has a series of random flaws in its crystal structure. This pattern of random flaws may be used for the extraction of feature vectors for identification and authentication.

In the present disclosure, a "feature" is not necessarily concerned with reading or recognizing meaningful content, for example by using methods like optical character recognition. A digital fingerprint of an object may capture both features of the object and features of any identifiers that are affixed or attached to the object. Feature vectors extracted from authentication regions located on an affixed identifier are based on the substances of which the identifier is physically comprised rather than the information (preferably alphanumeric) that is intended to be communicated by the identifier. For instance, in the case of a wine bottle, features may be captured from the bottle and from a label affixed to the bottle. If the label includes a standard UPC bar code, the paper of the label and the ink pattern of the bar code may be used to extract a feature vector without reading the alphanumeric information reflected by the bar code. An identifier, such as a UPC bar code print consisting of lines and numbers, has no greater significance in the generation and use of a feature vector than a set of randomly printed lines and numbers.

Although reading identifier information is not necessary for digital fingerprinting, in some embodiments, where a user desires to capture or store identifier information (such as a name, serial number, or a bar code) in an association with an object, the system may allow the user to capture such information and store it in the digital fingerprint. Identifier information may, for example, be read and stored by utilizing techniques such as optical character recognition, and may be used to facilitate digital fingerprint comparisons. In some cases, serial numbers may be used as the primary index into a database that may also contain digital fingerprints. There may be practical reasons for referencing serial numbers in relations to digital fingerprints. In one example, a user is seeking determine whether a bank note is a match with a particular original. In this case, the user may be able to expedite the comparison by referencing the bank note serial number as an index into the digital fingerprinting database rather than iterating through a large quantity of fingerprints. In these types of cases, the index recognition may speed up the comparison process but it is not essential to it.

Once a suitable digital fingerprint of an object is generated the digital fingerprint may be stored or registered in a database. For example, in some embodiments, the digital fingerprint may comprise one or more fingerprint features which are stored as feature vectors. The database should preferably be secure. In some embodiments, a unique identifier, such as a serial number, may also be assigned to an object to serve, for example, as a convenient index. However, assigning a unique identifier is not essential as a digital fingerprint may itself serve as a key for searching a database independent of any addition of a unique identifier. In other words, since a digital fingerprint of an object identifies the object by the unique features and characteristics of the object itself the digital fingerprint renders unnecessary the use of arbitrary identifiers such as serial numbers or other labels and tags, etc.

Figure 2:
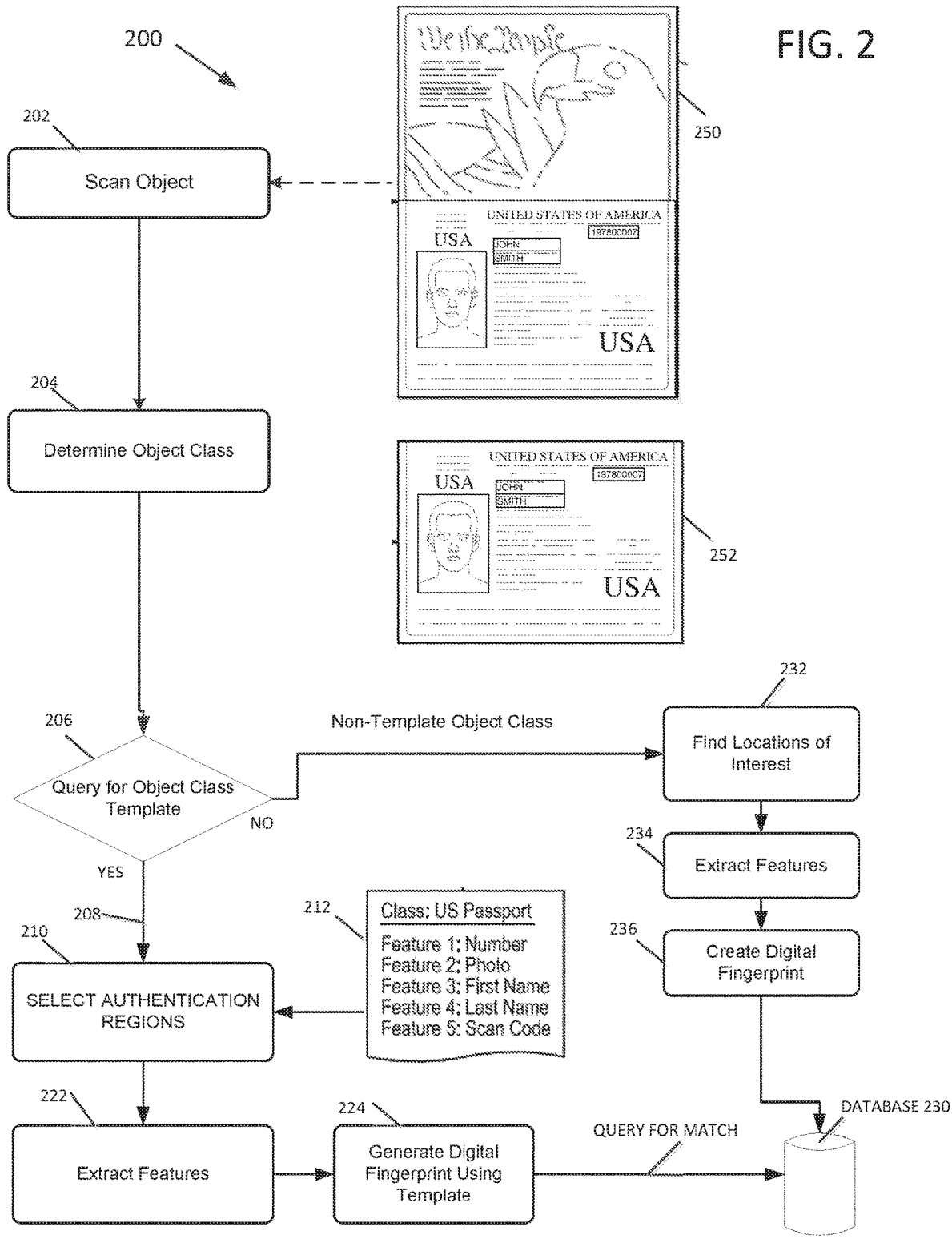
FIG. 2 is a simplified flow diagram of a process for authentication of a physical object based on digital fingerprinting.

FIG. 2 represents an example of a simplified flow diagram of a process 200 for authenticating or identifying an object using digital fingerprinting using a U.S. passport for illustration for part of the process. The process begins with scanning the object, block 202. An image 250 is acquired, in this illustration the front page of a U.S. passport is used. The next step is to determine a class of the object, block 204. This step may be omitted where the class is known. For example, at a border, a station may be in use that only checks U.S. passports. In another example, the system may be at a passport printing facility. Thus, the class of objects may be known a priori.

Next, at block 206, a database query may be conducted to see if a template exists in the system for the object that was scanned at 202. For example, in some cases, the initial image may be processed to extract a serial number or other identifying information. In an embodiment, the database may then be interrogated; decision 206, to see if a template exists for that serial number. If the answer is YES, path 208, the system accesses the template 212 and uses it to select one or more authentication regions 210. The template 212 lists the regions and their respective locations in the image (i.e. on the passport front page in this example). Physical locations may, as an example, be specified relative to a given location, and/or relative to each other. Location may be important because, for example, a replaced photograph may not be in exactly the same location as the removed original. In short, the template guides the authentication software in analyzing the image data. In that analysis, for each authentication region (called a "Feature" in 212), various features are extracted from the image data, block 222.

The extracted features are used to form a digital fingerprint of the object, block 224. For example, each feature may be described by a feature vector. Location and other data and metadata may be included in the fingerprint. In general, the process for extracting features and describing them in feature vectors may be specified in the template. The template may also specify which regions must be matched to declare the passport a match. In the passport example, all specified regions must match a record in the database for the passport to be determined to be authentic and unaltered. In other cases, a few matches may be sufficient. The digital fingerprint generated at block 224 is then used to query a reference database 230 for a match.

Returning to the decision block 206, there may not be an existing template in the system for the object under inspection—NO branch for "Non-Template Object Class." The process here may vary with the type of object under inspection and the purpose for the inspection. In some cases, a scanned image of an object may be processed to find locations of interest, block 232, for example, surface areas that are non-homogenous and thus have considerable image data content. In other words, finding locations of interest may be automated or semi-automated. The locations may be used to extract features, block 234 and/or recorded in a template for later use. Preferably, locations should be recorded in, or otherwise associated with, the digital fingerprint of the object.

In other examples, user input may be used to select authentication regions, and then the process proceeds to 234 as before. In some embodiments, an entire object may be scanned and all of the data processed to find and record digital fingerprint data. Whatever the case, the process proceeds to create a digital fingerprint, block 236, which can then be used to query the database 230 for a match. The match result may not be binary (yes/no); rather, in many cases, the result may indicate a confidence level of a match or may be a composite of binary results or confidence levels—such as when an object has been altered in part or in whole and/or has been assembled, or disassembled.

Example Authentication and Inspection Processes

In an embodiment, an object is scanned and an image is generated. The steps that follow depend on the operation to be performed. Several illustrative example cases are discussed below.

Case 1:

For authentication of a previously fingerprinted object, the following steps may be followed (see FIG. 3, discussed below):

1. One or more authentication regions are determined, such as automatically by a system, or by utilizing the authentication region definitions stored in a fingerprint template.

2. Relevant features are extracted from each authentication region and a digital fingerprint is generated. Feature extractions preferably will be in the form of feature vectors, but other data structures may be used, as appropriate.

3. Optionally, other information, for example a unique identifier such as a serial number may be extracted and stored to augment subsequent search and identification functions.

4. The digital fingerprint of the object to be authenticated is compared to digital fingerprints stored in a database.

5. The system reports whether (or to what extent) the object matches one or more of the digital fingerprints stored in the database.

6. The system may store the digital fingerprint of the object to be authenticated in the database along with the results of the authentication process. Preferably, only the extracted features will be stored in the database, but the authentication image and/or the original image and/or other data and metadata may be stored in the database, for example for archival or audit purposes.

Figure 3:
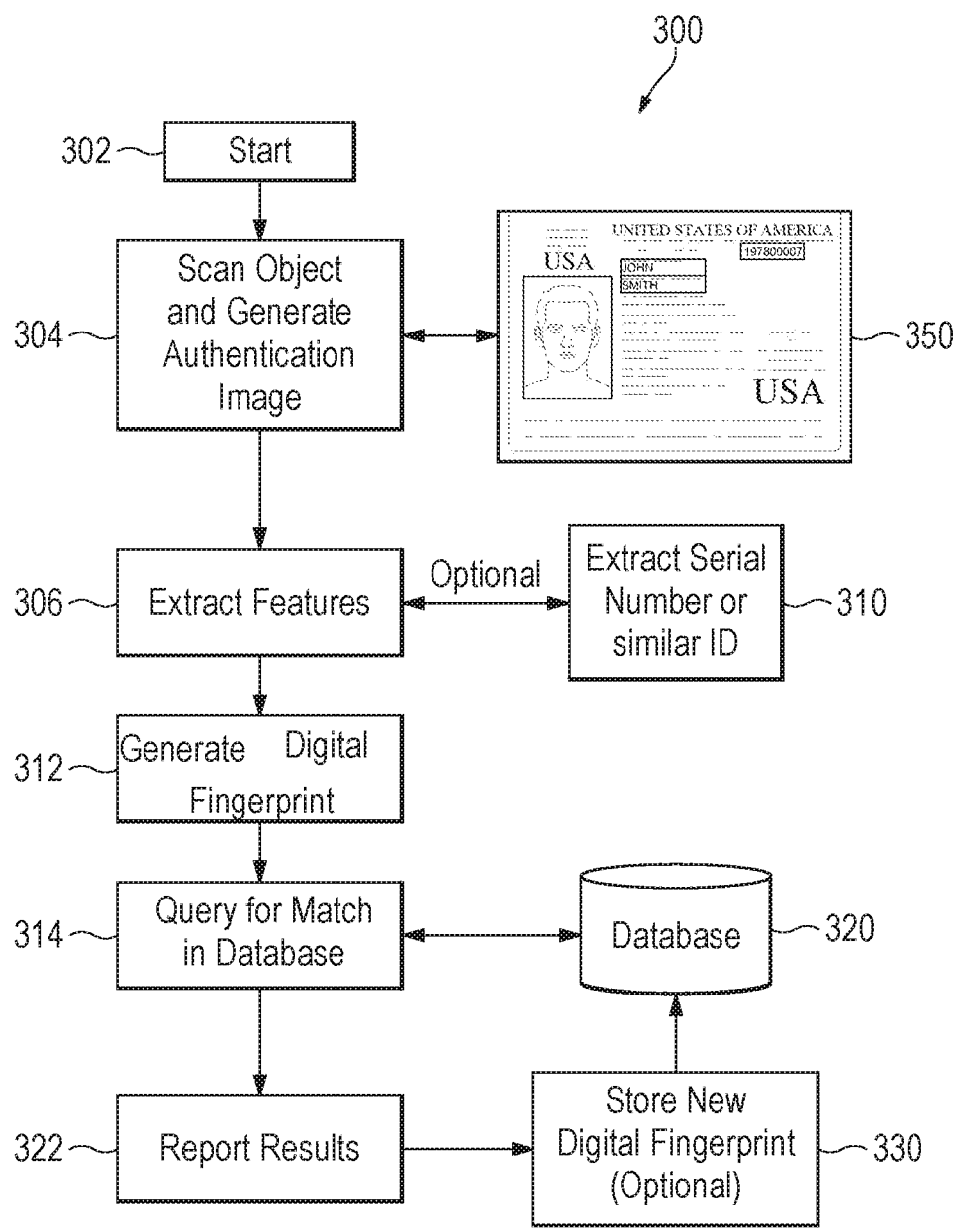
FIG. 3 is a simplified flow diagram of a process for authentication of a previously fingerprinted object.

FIG. 3 illustrates such a process 300 in diagrammatic form. Beginning at start block 302, the process scans an object and creates an authentication image, block 304. The image is represented at 350, using a passport as an example. Features are extracted, block 306, and optionally, other information, such as a serial number or similar ID number, preferably unique, may be extracted as well, block 310.

The extracted data is processed to generate a digital fingerprint, block 312. A database 320 may be queried for a matching fingerprint, block 314. A "match" may be defined by a binary, probability, or similarity metric or be a composite of metrics. Results of the database query may be reported to a user, block 322. Finally, a new digital fingerprint may be added to the database 320, shown at process block 330.

Case 2:

For inspection of specific features of a previously fingerprinted object to determine whether they have been altered, the steps are similar to Case 1, but the process is aimed at detection of alterations rather than authentication of the object:

1. One or more authentication regions are determined, such as automatically by the system, or by utilizing the authentication region definitions stored in a fingerprint template.
2. The features to be inspected are extracted from an authentication region and the digital fingerprint is generated. The features extracted may be in the form of feature vectors for the features to be inspected but other data structures may be used, as appropriate.
3. Optionally, other information, for example a unique identifier such as a serial number may be extracted and stored to be used to augment subsequent search and identification functions.
4. The digital fingerprint of features to be inspected for alteration is compared to the fingerprint of the corresponding features from the original object stored in the database.
5. The system reports whether the object has been altered; i.e. the extent to which the digital fingerprint of the features to be inspected match those previously stored in the database from the original object, in whole or in part.
6. The system may store the digital fingerprint of the features to be inspected in the database along with the results of the inspection process. Preferably, only the features will be stored in the database, but the authentication image and/or the original image and/or other data and metadata may be stored in the database for archival or audit purposes.
7. Cases 3 and 4 are elaborated in related patent applications.

In all of the above cases, features may be extracted from images of objects scanned under variable conditions, such as different lighting conditions. Therefore, it is unlikely two different scans will produce completely identical digital fingerprints. In a preferred embodiment, the system is arranged to look up and match objects in the database when there is a "near miss." For example, two feature vectors [0, 1, 5, 5, 6, 8] and [0, 1, 6, 5, 6, 8] are not identical but by applying an appropriate difference metric the system can determine that they are close enough to say with a degree of certainty that they are from the same object that has been seen before. One example would be to calculate Euclidean distance between the two vectors in multi-dimensional space, and compare the result to a threshold value. This is similar to the analysis of human fingerprints. Each fingerprint taken is slightly different, but the identification of key features allows a statistical match with a high degree of certainty.

Figure 4A:
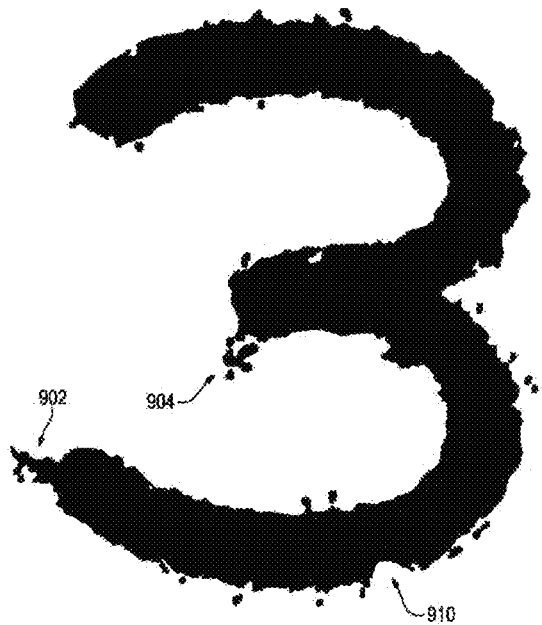
FIG. 4A shows an image of the numeral "3" representing the first digit in a serial number of an "original" or known U.S. dollar bill.

FIG. 4A illustrates an image of the numeral "3" representing a number printed on an "original" or known U.S. dollar bill. The bill may have been fingerprinted, for example, at the time of manufacture or public release, as described herein, or otherwise sufficiently authenticated for use as a reference. As noted below, fingerprint databases of currency and the like may be secured. Such databases preferably exclude raw image data. This image, on the order of about 40-fold magnification, shows a number of distinctive features visible to the naked eye.

Figure 4B:
FIG. 4B shows an image of the numeral "3" representing the first digit in a serial number of a U.S. dollar bill to be authenticated.

FIG. 4B illustrates an image of a number printed on a second or unknown U.S. dollar bill. The second bill may be fingerprinted using the same process, and then the resulting digital fingerprints, i.e., the respective fingerprint feature vectors, may be compared as further explained below, to determine whether or not the second bill is in fact the same one as the first bill. The comparison may take place even though the bill may have changed from wear and tear.

Figure 5A:
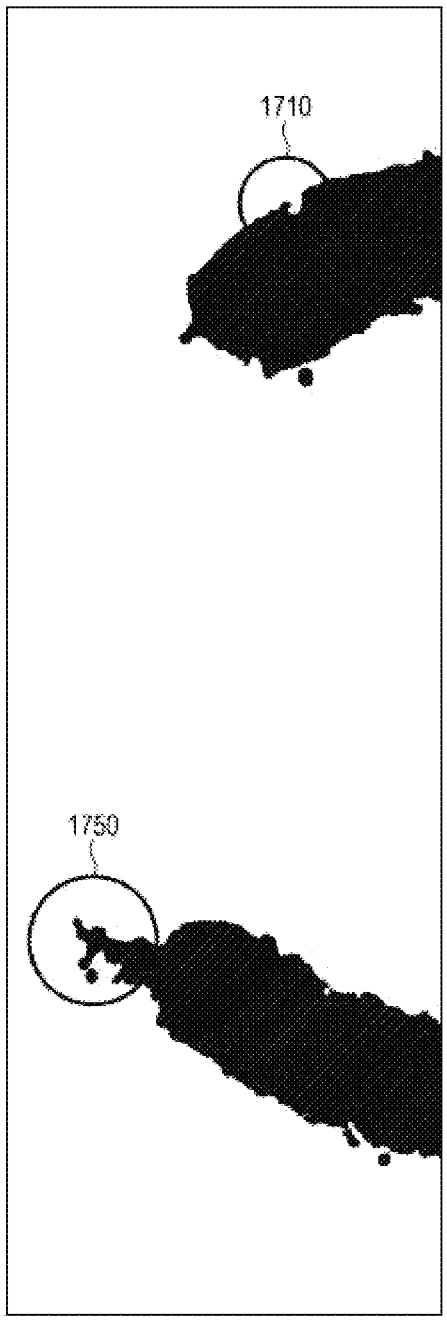
FIG. 5A is an illustration of results of feature extraction showing selected locations of interest in the image of FIG. 4A.

FIG. 5A is a simplified illustration of the results of feature extraction applied to the numeral 3 of FIG. 4A. In this figure, only the ends of the numeral are shown. Two locations of interest are called out by circles 1710 and 1750. The locations of interest need not necessarily be circular, but circular areas are advantageous for many applications. Below is a discussion on how these areas may be selected in an image. Fingerprint feature extraction is applied to each of the circular locations of interest. The results for each location may be stored as fingerprint feature vectors. To clarify, a "location of interest" (sometimes referred to as a "point" or "area" of interest), for example 1720, may well be a physical feature on the object, but the "feature vector" that characterizes that location of interest is not just a variation on the image around that location; rather, the feature vector is derived from it by any of a number of possible means. Preferably, a feature vector may be an array of numeric values. As such, feature vectors lend themselves to comparison and other analyses in a database system. A collection of feature vectors, say for location 1750, may be stored as a feature vector array.

Figure 5B:
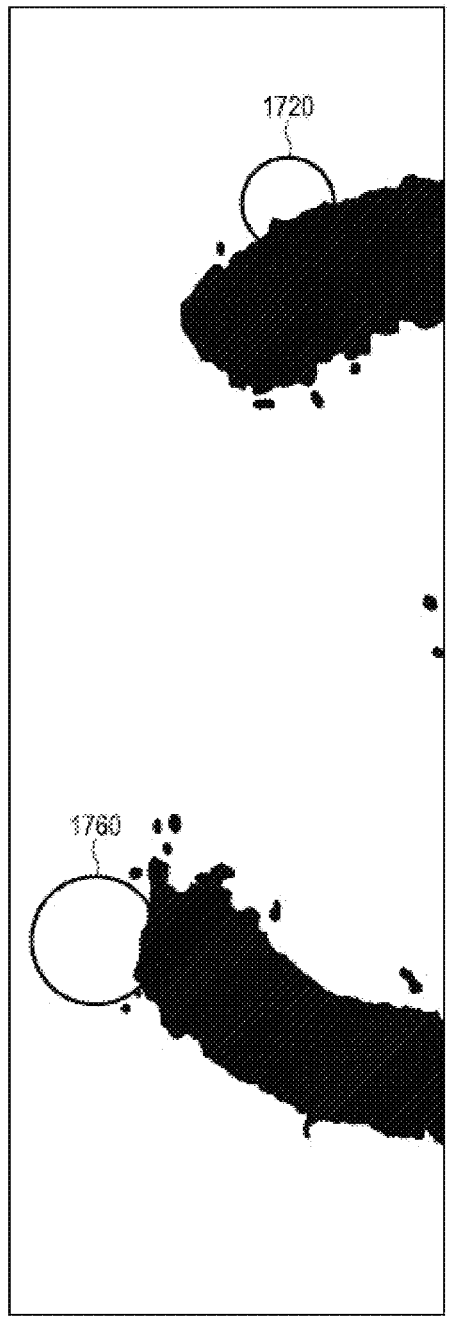
FIG. 5B is an illustration of results of feature extraction showing selected locations of interest in the image of FIG. 4B.

FIG. 5B is a simplified illustration of the results of feature extraction applied to locations of interest on the numeral 3 of FIG. 4B. The same fingerprinting process may be applied to this image. The same locations of interest as in FIG. 5A are labeled 1720 and 1760, respectively. The stored features (from the original object) are compared with the features extracted from the new object. As in this case, if the locations of interest are not encountered in the second object, or of the feature vectors characterizing those locations of interest are too different, there is no match (or a low confidence level for a match) for that location of interest. Variables, such as which locations must match and/or how many locations must match and/or the degree of matching required to conclude that an object matches the one previously fingerprinted, may in some embodiments be specified in a digital fingerprint record, further described below, or in some other associated record, to guide the decision process. This arrangement may be advantageous, for example, for exporting a database to a generic processor or system for remote authentication work. The matching logic may be embedded in the digital fingerprint record. Preferably, the matching logic is implemented in software as part of an authentication system.

One advantage of the feature-based method is that when an object is worn from handling or use (even very worn), a system may still identify the object as original, which may be impossible with the bitmapped approach. FIG. 6A shows a numeral from the same dollar bill image as in FIG. 4A, juxtaposed with FIG. 6B for comparison. FIG. 6B shows the numeral on the same bill after the bill has been subjected to washing in a washing machine, perhaps as a result of being left in the pocket of a piece of clothing. In FIG. 15B, the image (or, rather, the dollar bill) has been degraded; there is significant loss of ink and destruction of the paper surface in multiple locations. A bitmapped approach to matching would likely fail to match these two figures due to the large number of pixels that are now different, as relatively few of the pixels remain the same as the original.

FIG. 7A shows the detail of two fingerprint feature locations as before, 1610 and 1650. FIG. 7B shows detail of the damaged bill with the corresponding locations called out as 1620 and 1660, respectively. A comparison between the similarities of area 1610 to area 1620 and of area 1650 to area 1660 illustrates how a comparison of the corresponding fingerprint feature vectors would be adequate to result in a match. In practice, a much larger number of features would be used.

The image of the damaged bill is analyzed by a processor. The processor accesses a database of previously stored fingerprint data. If the dollar bill serial number is legible (by eye or machine), the record for the corresponding bill may be accessed from the datastore using the serial number as an index. Similarly, if any portion of the serial number is legible, the search for a matching record can be narrowed on that basis. Either way, a candidate record, containing a set of stored regions of interest may be compared to the image of the damaged bill.

As explained above, in addition to being able to recognize a worn object, the feature-based approach is able to address other external problems such as rotated images. This is especially relevant in a system where an unsophisticated user, such as a retail customer, may be scanning an object to be authenticated. In such cases, external factors like lighting and rotation may not be under the system operator's control.

Figure 8:
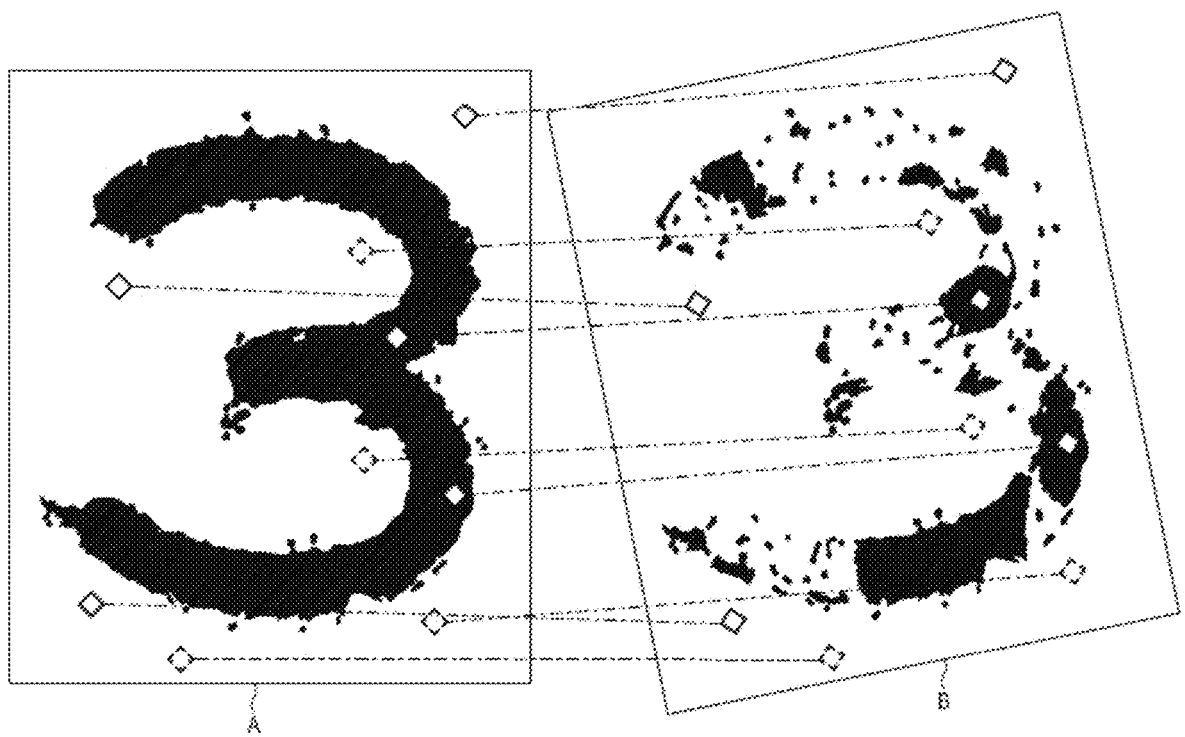
FIG. 8 is a simplified illustration of a rotational transformation in the process of comparing digital fingerprints of two images.

Referring now to FIG. 8, which shows the original image on the left side, with a small set of fingerprint features marked as small diamond shapes. This is merely a callout symbol for illustration. In some embodiments, as noted, preferably circular areas are used. For each feature (preferably identified in the database record), a search is conducted of the suspect image on the right side of FIG. 8 (or a portion of it) for a matching feature. The position may not match exactly, due to "stretch", an effective difference in magnification, and/or due to rotation of the image, or due to other circumstances. Although it may not match locations literally; a mathematical transformation may be defined that maps one image to the other, thereby accounting for rotation and stretch as appropriate. Thus, a bounding rectangle A indicated by the box in the left side image may be mapped to a quadrilateral, indicated by the line B in the right-side image.

Once an appropriate transformation is found, further matching may be done to increase the level of confidence of the match, if desired. In some embodiments, a number of matches on the order of tens or hundreds of match points may be considered sufficient. The number of non-match points also should be taken into account. That number should preferably be relatively low, but it may be non-zero due to random dirt, system "noise", and other circumstances. Preferably, the allowed mapping or transformation should be restricted depending on the type of object under inspection. For instance, some objects may be inflexible, which may restrict the possible deformations of the object.

Summarizing the imaging requirements for a typical fingerprinting system, for example for inspecting documents, the system preferably should provide sufficient imaging capability to show invariant features. Particulars will depend on the regions used for authentication. For many applications, 10-fold magnification may be adequate. For ink bleeds on passports, bills, and other high-value authentication, 40-fold magnification may likely be sufficient. In preferred embodiments, the software should implement a flexible response to accommodate misalignment (rotation), misorientation, and scale changes. Color imaging and analysis is generally not required for using the processes described above, but may be used in some cases.

Induction and Authentication

Figure 9:
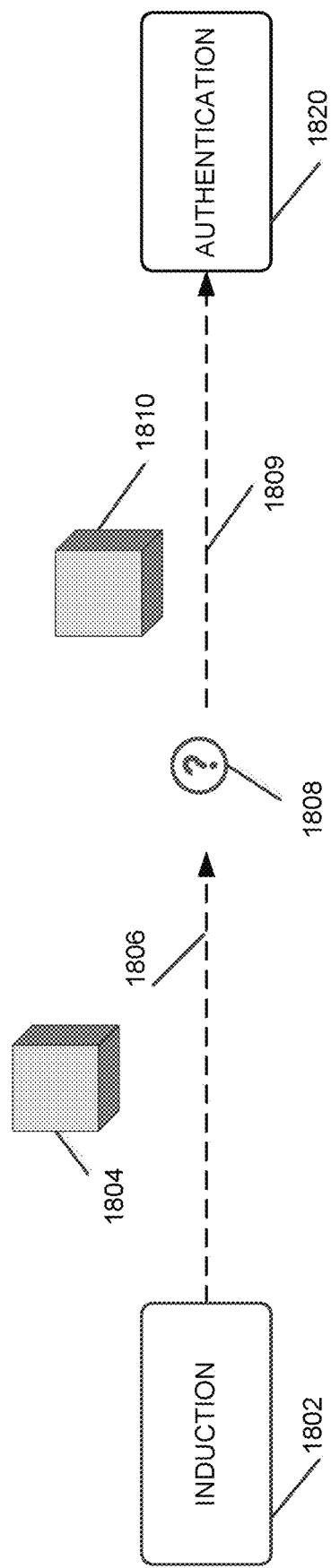
FIG. 9 is a simplified flow diagram of an induction-authentication process.

FIG. 9 is a simplified diagram illustrating the concepts of induction and authentication. The term "induction" is used in a general manner to refer to entering an object or a set of objects into an electronic system for subsequently identifying, tracking, or authenticating the object, or for other operations. The object itself is not entered into the system in a physical sense; rather, induction refers to creating and entering information into a memory or datastore from which it can later be searched, interrogated, retrieved, or utilized in other kinds of database operations.

In FIG. 9, induction 1802 thus may refer to a process that includes capturing an image of an object (or part of an object), processing the image to extract descriptive data, storing the extracted data, or any or all of these operations. The inducted object, represented by a cube 1804, then leaves the induction site, and proceeds in time and space along a path 1806. Induction may be done at the point of creation or manufacture of the object, or at any subsequent point in time. In some cases, induction may be done clandestinely, such as without the knowledge of the person or entity currently having ownership and/or possession of an object. The term "possession" is used in the broadest sense to include, for example, actual physical possession, as well as control—for example, having they key to a secure physical storage where an object is kept.

After induction, the object 1804 may encounter wear and tear, and otherwise may change, intentionally or not, in ways that may not be known a priori, represented by the question mark 1808. The original object 1804 may even in fact be lost or stolen after induction and a counterfeit may be introduced. Along path 1809, an object 1810 may be presented for authentication, represented by block 1820. Below are described some additional scenarios and use cases for the authentication technology described herein, and what may be done under the broad heading of "authentication". Under many circumstances, induction, authentication, or both may be done remotely by use of technology such as drones or by other covert means. In one example, an agent may take a photograph of an object with a smartphone, without the knowledge or consent of the possessor of the object, and the resulting image may be utilized for induction and/or authentication as described herein.

More specifically, in some embodiments, some part of the induction/authentication process may be done remote from a facility intended for that purpose. In addition, some part of the induction/authentication process may be accomplished without the knowledge of the then-current possessor of an object. In particular, the induction and/or authentication are not part of the current possessors' normal processes. These two criteria are not essential for the present disclosure, but are generally representative of some applications.

Figure 10:
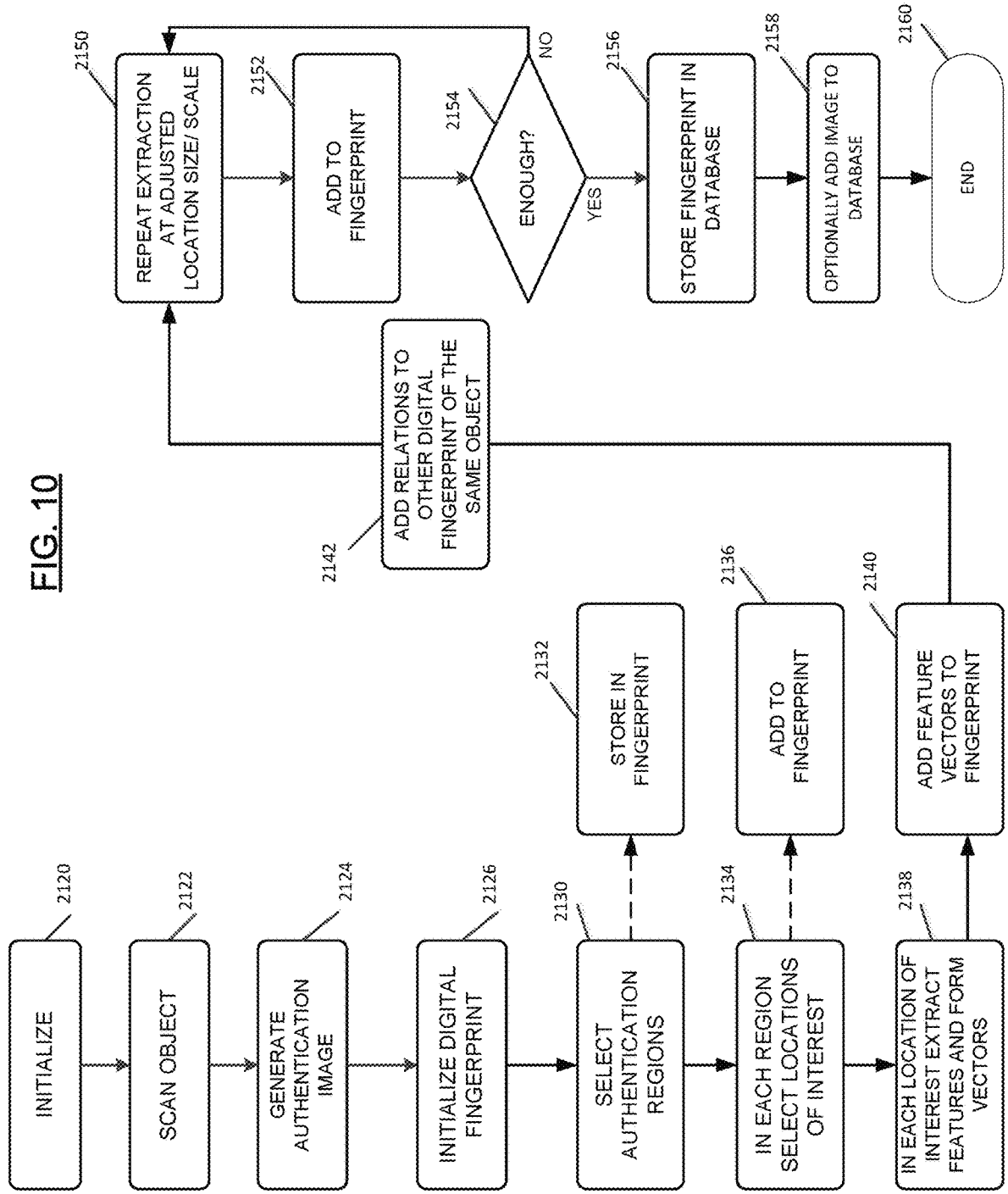
FIG. 10 is a simplified flow diagram of one example of a process for creating a digital fingerprint of a physical object.

FIG. 10 is a simplified flow diagram of one example of a process for creating a digital fingerprint that includes feature vectors based on a scanned image of an object. The process begins with initialization at block 2120. This step may comprise initializing a datastore, calibrating an image capture system, or other preliminary operations. An object or object is scanned, block 2122, forming digital image data. Preferably, depending on the context, the scanning may be automated. In other cases, an operator may be involved in manual scanning. From the image data, an authentication image is generated, block 2124, which may comprise all or a selected subset of the scan data. Next, a digital fingerprint record may be initialized, for example in a memory or datastore, block 2126.

To begin forming a digital fingerprint of a scanned object, at least one authentication region is selected, block 2130, in the authentication image data. This selection preferably is carried out by the fingerprinting software. The authentication region(s) may be selected according to a predetermined template based on the class of objects. Locations of the authentication regions may be stored in the digital fingerprint record, block 2132.

At block 2134, the process continues by selecting locations of interest within each authentication region. To select locations of interest (areas in an image from which to extract fingerprint features), a software process may automatically select a large number—typically hundreds or even thousands per square mm—of preferred locations of interest for purposes of the digital fingerprint. A location may be of interest because of a relatively high level of content. That "content" in a preferred embodiment may comprise a gradient or vector, including a change in value and a direction. The selected locations of interest may be added to the fingerprint record, block 2136. In one example, such areas may be identified by a location or centroid, and a radius thus defining a circular region. Circular regions are preferred for some applications because they are not affected by rotation of the image.

Next, block 2138, the process calls for extracting features from each location of interest, and forming feature vectors to describe those features in a compact form that facilitates later analysis, for example, calculation of vector distances as a metric of similarity in comparing fingerprints for authentication. Various techniques are known for extracting such features. The resulting feature vectors are added to the fingerprint, block 2140. At block 2142, additional information may be added to the digital fingerprint identifying other fingerprints and related information associated with the same object. In some embodiments, a relationship, such as relative location of the other fingerprints to the current fingerprint may be used. For example, in some objects, multiple regions may be authentic individually, but a change in their relative location may indicate that the object is not authentic. Thus, a fingerprint record may include first and second feature vectors (each describing a corresponding feature extracted from an area of interest) and a relative location of one to the other.

Note that FIG. 10 gives a limited example of the information components contained in a digital fingerprint. In one preferred embodiment, other information (not shown in FIG. 10) relating to the identification and tracking of an object may be incorporated, stored, or otherwise associated with an object's digital fingerprint record. When referencing an object's digital fingerprint, the components of the digital fingerprint referenced may vary based on system operation or user preference. In some cases, other information such as dimensions, color, shape and such may be stored in a digital fingerprint but not necessarily stored as a feature vector.

Above, with regard to FIG. 8, the transformation from one set of feature vectors to another was described, to accommodate stretch, rotation or variations in magnification. In similar fashion, relative locations of features in a fingerprint can be stored in the record and used for comparison to a new fingerprint under consideration. The feature extraction may be repeated, block 2150, using an adjusted area size or scale (such as magnification). Feature vectors created at the adjusted size may be added to the fingerprint, block 2152. Additional features may be extracted at additional magnification values, until an adequate number are provided, decision 2154. This additional data may be added to the fingerprint, block 2156. This data may be helpful in finding a matching fingerprint where the authentication image magnification is not the same as the image at the time of induction of the object. Finally, and optionally, the scanned image itself (generated at 2122) may be added to the database, block 2158. This process to build a digital fingerprint ends at 2160.

Authentication-Based Tracking

Figure 11:
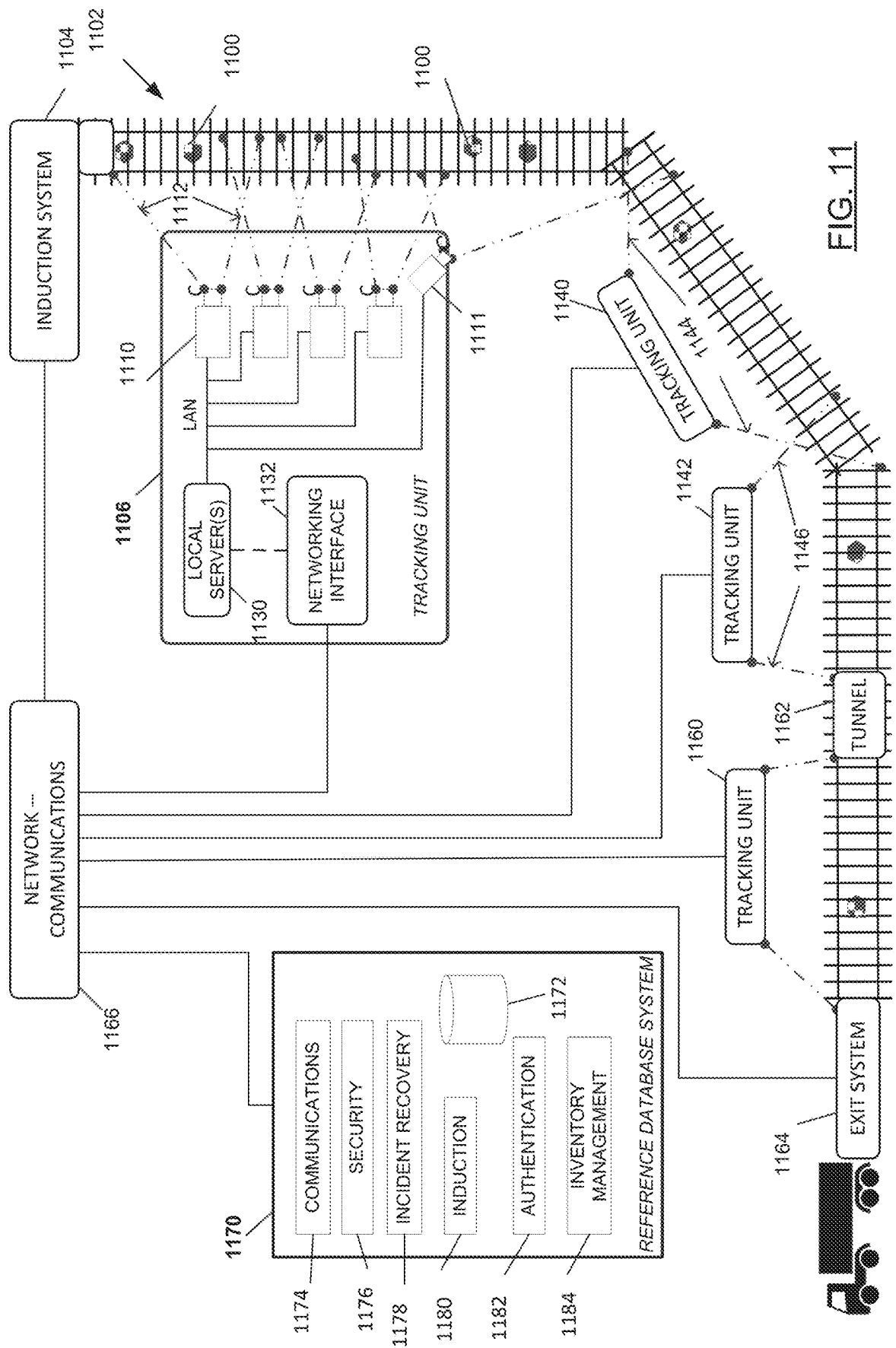
FIG. 11 is a simplified system diagram to realize positive control of objects consistent with the present disclosure.

FIG. 11 is a simplified system diagram for positive control of objects consistent with the present disclosure. For illustration, we describe the objects as luggage items or "bags" as may be moving in the "bag room" at an airport, from intake, say at a ticket counter, to the ramp for loading on an aircraft. The system of FIG. 11 includes several Tracking Units ("TU"). A TU in some embodiments may comprise one or more scanners, such as cameras, computer processors, and communication system connections. For example, in FIG. 11, one TU 1106 shows plural cameras 1110, a local server or processor 1130, and the processor coupled to a networking interface 1132 for external communications. The cameras 1110 may be coupled, for example, by a LAN, to the processor or local server 1130. The LAN or other suitable infrastructure enables the processor to collect image data from the cameras 1110.

In this illustration, a conveyor system 1102 is shown in simplified form. An induction system 1104 may be used to induct objects 1100 into a fingerprint-based system as detailed above. In the air travel example, the luggage bags may be inducted at an induction system adjacent to the ticket counter or other check-in location such as a kiosk or curb-side counter. The bags may be inducted into a reference database system 1170. The induction system(s) may be coupled via network communications infrastructure 1166 which may also provide communications among multiple tracking units 1106, 1140, 1142, 1160. In an example, the reference database system 1170 may comprise a database 1172 to store digital fingerprints and related data. The database system 1170 may further include software components for communications 1174, security 1176, incident recovery 1178, induction 1180, authentication 1182, and inventory management 1184. These components are typical but not exhaustive. The functions listed are not necessarily assigned to specific components as shown.

The cameras 1110 of tracking unit 1106 are located along a portion of the conveyor system 1102 with contiguous or overlapping ability to see the conveyor system except, possibly, areas that are not visible to the scanners and where the object may be under some other form of positive control. Examples of an area of positive control include being within the hold of an aircraft or a locked and sealed shipping container. The overlapping or contiguous fields of view are each indicated by a pair dashed lines, for example, lines 1112 with regard to camera 1110. The TU 1106 is responsible for a corresponding region of the conveyor within view of its cameras. The next adjacent region, covered by a next tracking unit 1140, similarly has one or more cameras (not shown) that can view the region indicated by dashed lines 1144. Note that TU 1160 camera 1111 has a field of view that overlaps with the next tracking unit 1140 field of view. Similarly, the TU 1140 field of view 1144 overlaps with the next TU 1142 field of view 1146, etc. In this way, each object (bag) traveling on the conveyor system 1102 is always in view of at least one camera of a tracking unit (TU), except, as noted, when the item is in some other area of positive control. Another example of such an area of positive control is represented by a tunnel 1162, in between the fields of view of TU 1160 and TU 1142. The tunnel prevents any object from entering or leaving the conveyor except at the ends of the tunnel. There, the corresponding TUs observe what goes into and what emerges from the tunnel, so that continuous positive control is maintained. Finally, an exit system 1164 may be provided. The exit system may confirm identification of objects as they leave the conveyance system, for example, during loading onto a truck or into an airplane cargo container. The exit system in an embodiment may be implemented with a modified tracking unit. Preferably, it may be networked to 1166 as shown.

In some embodiments, each TU receives from upstream TUs the timing and identification information (e.g. digital fingerprints and other identifiers or serial numbers) of expected bags. As each bag arrives, the TU images it, extracts its identification features, identifies the object as the one seen by the next operating camera upstream (and possibly as the one inducted at the start of transport), determines that its arrival time is within tolerance of the expected arrival time sent by upstream TU(s), and passes on to the next TUs downstream identification information and expected arrival times.

Identification Methods. In some embodiments, when an object is under initial positive control (when the object is first manufactured or where the passenger checks in his bag) high resolution images of the object are acquired and digital fingerprints extracted from them. The digital fingerprints are associated with an object record (e.g. the passenger record for airports). The digital fingerprint generated at check-in is used to inform the next TU(s) down the line of the identifying information for the current bag. This is a much simpler discrimination task than identifying one back out of tens of thousands and can generally be performed with a sub stantially-reduced feature vector set. In addition, the downstream TU(s) are told when to expect the object. They are either told the tolerances for arrival or get that from the database system.

In some embodiments, in cases where a physical object remains in a controlled area from one TU to the next, the downstream TU may assume the identity of the object is what the upstream TU provided, as long as the object arrives in the field of view of the downstream TU within an arrival time tolerance limit. In cases where the downstream TU receives an object that has passed through an uncontrolled area on its way from the upstream TU, or if the object arrives outside the tolerance limits of arrival time, or if there is actual or potential confusion between objects (such as when multiple objects arrive at the downstream TU within an arrival time range allocated to one or more objects, a TU downstream from the uncontrolled area preferably will independently identify the object or objects by referencing the digital fingerprints of the objects. In general, referencing digital fingerprints may refer to the matching (or attempted matching) of digital fingerprints in whole or in part or components thereof, such as of feature vectors and/or additional object-specific identifying features stored in the digital fingerprint record. Uncontrolled areas may be, for example, areas that are temporarily or permanently outside of the field of view of tracking units or areas where the field of view is obscured.

In one embodiment, each TU has several functions under normal operation, including but not limited to the following:

(1) Track the position of an object for later use (e.g. passing to downstream TUs or for transportation system operation, such as operating a diverter gate. In the taught system, the object is always in view of a TU unless some other form of positive control exists. The bag may, for example, go through a tunnel where watching it is impossible, but if both the entrance and the exit to the tunnel are under positive control and the tunnel is otherwise secure from unauthorized entry, the bag is considered under positive control while in the tunnel. Similarly, a bag in a loading container being transported to the airplane hold is considered to be under positive control provided it was under positive control when it entered the loading container and the loading container is sealed in a way that prevents unauthorized entry.

(2) Identify the object as the expected one. Identification may consist of referencing digital fingerprint information recorded in the object's database record or passed on from the TU(s) upstream.

(3) Pass on the timing information and digital fingerprint information to the next TU(s) downstream. If there are points of diversion between this TU and the next ones downstream, all possible next TUs receive this information. This information may be confirmed by the receiving TU(s) as a safeguard against TU failure or maintenance.

(4) Reacquire the object after some other period of positive control such as the abovementioned tunnel, the explosives detector, or TSA manual screening.

In a luggage handling scenario, for example, under most conditions, a bag will not change orientation or which side is up in going from one TU to the next. In that case, whatever digital fingerprints were used as references by the next upstream TU may be sufficient for the current TU to use as well. In the event of exceptions, however (when the simple identification fails), such as a bag tumbling and now presenting a different side to the TU, the next TU to see the bag needs access to the digital fingerprint of the bag that was generated at check-in for comparison. This is true in the event of loss of positive control of any kind. If there is a jam, for example, sorting out the bags after the jam will require the next TUs downstream to have access to the digital fingerprints of all the bags that might have been involved in the jam. Much of the time these can be digital fingerprint information extracted and confirmed by the TU(s) upstream from the jam, but sometimes will have to be the digital fingerprint generated at the beginning (e.g. at bag check-in). That data may be acquired, for example, by a request to a central server or database system.

When the bag goes through a gap in coverage, the situation is much like that in a jam. Such loss of positive control occurs at the explosives detectors, at TSA inspection stations, and some other places such as at the belt that loads the airplane hold. To recover from the lack of coverage the relevant TUs must have access to the digital fingerprints of all bags that could be present. The digital fingerprints include feature vectors extracted from the corresponding bag.

Progression of Identification Techniques. In some embodiments, a TU may be capable of an escalating hierarchy of identification techniques as may be necessary:

In an embodiment, under normal use the TU extracts simplified digital fingerprints from an image of the object and compares them to digital fingerprints from expected bags sent on (or tags to a centralized database of current system objects sent on) from upstream TUs. If the identity of the bag is confirmed and that it arrived on time, the TU (or the system) passes the expected arrival times and digital fingerprints to downstream TUs.

In some embodiments, if a TU identifies a bag but finds it out of place by more than some tolerance, it sends an exception to the tracking system. An arrival time outside the tolerance limits may indicate a bag was tampered with and the system may require further inspection of the bag. It may also indicate the bag slid while going down a slope.

If simple identification does not work, digital fingerprint information from all sides of the expected bag may be compared. If they match, the bag (and its information) continues downstream as before.

If the bag cannot be identified but has been positively tracked since the last identifying station, the TU may flag the database with its failure but the bag continues. If a second TU also fails to identify the bag, it may be routed for exception handling. In some cases, as described above, in the case of continuously and positively controlled objects, their identity may in some cases be assumed by TUs as long as they remain controlled and arrive within a time frame that is within the system's toleration limits. Whether or not a positive identification at every TU is required, or the degree to which positive identifications are required, may be set by the system owner.

In some embodiments, if positive control has been lost (as a matter of course, i.e. not as the result of a jam), the TU compares the digital fingerprints of possible bags with the ones it extracts. If it successfully identifies the bag, the bag continues down the conveyor system. This includes places where the conveyor is temporarily obscured (in which case "possible bags" may be only the most recently seen by the upstream camera), as well as known break points (such as the explosives detector and TSA inspection stations in the case of airport baggage tracking). "Break point" refers to a situation where positive control of an object is lost. It may be re-established later, as when TSA returns a bag after inspection, or a jam is cleared.

In some embodiments, if positive control is lost because of a TU failure, downstream TUs take over for the failed unit as though a normal loss of positive control has taken place.

In some embodiments, in the event of a jam, once the jam has been cleared, all bags identified by downstream TUs are reentered into the system (e.g. for where they need to be routed) and all not identified are tagged for exceptions processing.

In some embodiments, in each of the above cases, before reporting failure to identify, the TU may try first the digital fingerprints from the immediately expected bag, then from all reasonably expected bags, and finally from other bags in the system. In cases where such comparison takes too long, a TU (or other system components) may tell downstream TUs to throw an exception for a bag that fails identification.

Tracking database and system. In some embodiments, this will be the tracking system modified to hold digital fingerprint and tracking information received from the TUs, as well as to handle any exceptions reported. The system adds objects on initial induction (e.g. check-in at an airport) and may remove them when they leave the system (e.g. when loaded on a plane or when picked up at a baggage carousel). In addition to providing information for authentication-based tracking, the system must be able to handle manual requests for full bag identification using system-wide data (e.g. for a bag that cannot otherwise be identified and may be a lost bag from someplace else).

If object aggregation occurs (e.g. bags in a loading container or the hold of an airplane, individual drug doses in a pallet), the system must be capable of multi-level authentication, provided the aggregated unit can be securely sealed during transport to prevent tampering.

FIG. 12 is a simplified flow diagram further illustrating selected aspects of operation of a tracking unit (TU) to realize positive control of objects. In an embodiment, the subject TU receives data from an upstream TU, block 2322. In some cases, for example, where the upstream TU is disabled, off-line, etc., the TU may instead receive data and/or instructions from a central or supervisory process. The current TU detects an incoming object, block 2324, for example, by means of a switch, camera, photocell, or other detector. In one example, the entry may be detected by a camera arranged for that purpose such as camera 1110 (FIG. 11). The TU acquires one or more digital fingerprints from the incoming object, block 2326, for example, using a camera or scanner as described above.

Next, the TU compares the acquired digital fingerprint of the incoming object to the data received from the upstream TU, block 2328, and determines whether the digital fingerprint obtained from the incoming object matches a digital fingerprint of an expected incoming object, decision 2330. If the fingerprints match, the TU may also check whether the object arrived within an expected timeframe, decision 2338. A delay, or an arrival before an expected time, may be a suspicious circumstance that warrants further investigation. The timing may be a datum for input to an AI system that assesses the risk of a foreign object intrusion into the system. Accordingly, arrival of an object outside of an expected timeframe spawns an exception, block 2340. The exception may be realized in a message to a reference database system or to a supervisory process.

If the object arrived in a timely manner, the TU may update the relevant database, block 2350, for example, to record the arrival, and perhaps a timestamp. The TU may pass on its results to a next downstream TU, block 2352.

Referring again to decision 2330, if the object's digital fingerprint did not match as expected, a more thorough check may be made, for example, by comparing digital fingerprints from additional sides of the object, block 2360. In some embodiments, fingerprints may be acquired at intake from multiple sides of an object. For example, an intake system may have multiple scanners arranged around an object to acquire fingerprints. If an object rotated during conveyance or handling, a fingerprint previously acquired from a different side may then match. The additional fingerprints may be checked by querying a reference database. If a match is found, decision 2362, the TU may again check the timeliness of the arrival as before, decision 2338.

If a match is not found at 2362, the TU may conduct a broader search by comparing the new arrival digital fingerprint with all of the objects reasonably expected to arrive at the TU at 2370. For example, the order (sequence) of an adjacent pair of objects may have been switched by manual handling, for instance, an object may have fallen off a conveyor, and a worker replaced it but not in exactly the same spot. The bag would then match one of a set of reasonably expected objects—those "in the neighborhood"

at the time. If that match is found, decision 2372, the TU may again update the database, block 2350, and proceed as before to block 2352.

In a case that no match is found at 2360 or at 2370, the TU may conduct an even broader inquiry by comparing the current digital fingerprint to all of the objects then in the system, block 2380. The "system" of interest here may be a local system, for example, an airport bag room as described above. More broadly, the system may include all airports served by the carrier. In this way, the TU may identify an object that erroneously arrived far from its intended destination. Thus, the errant object is located very quickly; indeed, it may be located before it was determined to be "lost." Even more broadly, the TU may query other airline systems that have implemented digital fingerprinting to resolve a "lost or missing" bag for them. Finally, if no match is found, decision 2382, the TU may send an insertion alert, block 2390, to alert authorities or a supervisory process, that an unrecognized or "foreign" object has been inserted into the system. The foreign object may be scanned for identification purposes.

Hardware and Software

Most of the equipment discussed in this document comprises hardware and associated software. For example, the typical portable device is likely to include a camera, one or more processors, and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein. The stored data may be volatile but it is non-transitory; that is, it is not in the form of signals.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Consequently, in view of the wide variety of permutations to the embodiments described herein, this detailed description and accompanying material is intended to be illustrative only, and should not be taken as limiting the scope of the invention.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A tracking unit for a tracking system, comprising:
   a capture device having a first field of view;
   a processor coupled to the capture device to acquire digital image data from the capture device, the acquisition of the digital image data responsive to a physical object in the first field of view, wherein the digital image data includes data representing at least a portion of a surface of the physical object;
   a networking interface coupled to the processor;
   a memory accessible to the processor and storing executable program code to cause the processor, by executing a fingerprinting portion of the program code, to:
      identify locations of interest in the digital image data, each location of interest in the digital image data corresponding to a respective location on the surface of the physical object;
      extract features from the digital image data for at least some of the identified locations of interest in the digital image data, each identified location of interest of the identified locations of interest corresponding to a respective location on the surface of the physical object and each feature being inherent to the physical object;
      store each extracted feature as a feature vector;
      create a digital fingerprint of the physical object using as a set of information that includes a plurality of the stored feature vectors;
      query a datastore using the digital fingerprint to identify the physical object based on the locations of interest in the digital image data, each location of interest in the digital image data corresponding to a respective location on the surface of the physical object;
      communicate, using the networking interface, a timing of the physical object on a route and the identification of the physical object to a downstream tracking unit; and
      simultaneously determine an identity and a location of the physical object at all times as it travels along the route.

2. The tracking unit of claim 1, comprising:
   a second capture device coupled to the processor and having a second field of view that overlaps or abuts the first field thereby leaving substantially no gap between the first and second fields of view.

3. The tracking unit of claim 1 wherein the executable program code is further configured to cause the processor, by executing an arrival time portion of the program code, to:
  receive an expected arrival time and identification information of an expected physical object expected to enter the field of view;
  detect an arrival of an arrived physical object into the field of view;
  acquire a digital fingerprint of the arrived physical object;
  compare the digital fingerprint of the arrived physical object to the received identification information to determine a result; and
  take a predetermined action based on the result.

4. The tracking unit of claim 3 wherein the executable program code is further configured, by executing an alert portion of the program code, to cause the processor to:
  in a case that the digital fingerprint of the arrived physical object does not sufficiently match the received identification information of the expected physical object, send an alert indicating an unrecognized physical object to a central server or a second tracking unit.

5. The tracking unit of claim 3 wherein the executable program code is further configured to cause the processor, by executing querying portion of the program code, to:
  in a case that the digital fingerprint of the arrived physical object does not sufficiently match the received identification information, of the expected physical object, query a database using the arrived physical object digital fingerprint to identify the arrived object, the database storing records of objects previously inducted into the tracking system.

6. The tracking unit of claim 3 wherein the executable program code is further configured to cause the processor, by executing a predetermined action portion of the program code, to:
  in a case that the digital fingerprint of the arrived physical object sufficiently matches the received identification information, determine whether an actual arrival time of the arrived physical object is within a predetermined tolerance of the expected arrival time; and
  take a predetermined action based on the determination that the actual arrival time is within the predetermined tolerance.

7. The tracking unit of claim 6 wherein the executable program code is further configured to cause the processor, by executing second arrival time portion of the program code, to:
  in a case that the actual arrival time of the arrived physical object is within the predetermined tolerance of the expected arrival time, transmit to a second tracking unit the identification information and a second expected arrival time of the arrived physical object at the second tracking unit, wherein the second tracking unit is located downstream of the first tracking unit.

8. The tracking unit of claim 6 wherein the executable program code is further configured to cause the processor, by executing a downstream tracking portion of the program code, to:
  identify a next downstream tracking unit based on applicable diverter gate information; and
  transmit the identification information and the expected arrival time to the identified next downstream tracking unit.

9. The tracking unit of claim 6 wherein the executable program code is further configured to cause the processor, by executing a diverter portion of the program code, to:
  in the absence of diverter information, transmit to all possible downstream tracking units the identification information and a second expected arrival time of the arrived physical object at all of the possible downstream tracking units.

10. The tracking unit of claim 6 wherein the executable program code is further configured to cause the processor, by executing a multiple tracking units portion of the program code, to:
  in an application where there is more than one tracking unit immediately downstream, transmit the identification information to all of the immediately downstream tracking units.

11. The tracking unit of claim 3 wherein the executable program code is further configured to cause the processor, by executing a confirmation portion of the program code, to:
  send a confirmation to one or more upstream tracking units.

12. The tracking unit of claim 3 wherein the executable program code is further configured to cause the processor, by executing a lost control portion of the program code, to:
  reacquire the arrived physical object after a period of loss of positive control of the arrived physical object when the arrived physical object was outside a purview of the tracking unit; and
  provide data about the arrived physical object to a downstream tracking unit, wherein reacquiring the arrived physical object includes creating a new digital fingerprint of the arrived physical object, and querying the datastore using the new digital fingerprint to identify the arrived physical object.

13. A tracking system, comprising:
  a plurality of tracking units, each of the tracking units (a "TU") capable of data communications over a network with other components of the tracking system, the plurality of tracking units including an upstream tracking unit and a downstream tracking unit wherein a physical object is adjacent the downstream tracking unit after the physical object is adjacent the upstream tracking unit while the physical object is moving along a path, wherein each tracking unit of the plurality of tracking units includes:
  at least one scanner that covers a corresponding field of view;
  a TU processor coupled to the at least one scanner to acquire digital image data from the at least one scanner, said acquisition of digital image data responsive to the physical object located within the corresponding field of view of the at least one scanner;
  a TU memory accessible to the TU processor, said TU memory storing executable TU program code to cause the TU processor, by executing a fingerprinting portion of the TU program code, to:
    identify locations of interest in the digital image data acquired from the at least one scanner, each of the locations of interest corresponding to a location on a surface of the physical object;
    extract features from the digital image data for at least some of the identified locations of interest;
    store each extracted feature as a feature vector;
    create a digital fingerprint of the physical object located within the corresponding field of view of the at least one scanner using as a set of information that includes a plurality of the stored feature vectors; and communicate, using the networking interface, a timing of the physical object on the route and the identification of the physical object to the downstream tracking unit;

wherein each TU of the plurality of tracking units provides a respective contiguous field of view formed by an aggregate of the corresponding field of view of each scanner of the at least one scanner; and an input region that covers the contiguous field of view of the respective tracking unit, wherein the respective tracking unit is arranged to acquire digital image data responsive to any object that enters into the input region of the respective tracking unit;

wherein the plurality of tracking units are positionable to arrange the respective contiguous fields of view of each tracking unit of the plurality of tracking units together to form a system field of view that covers at least a predetermined portion of a physical system arranged for conveyance of physical objects;

wherein the plurality of tracking units are arranged to provide authentication of the physical object by each of the TUs as the physical object travels within the predetermined portion of the physical system to continuously track the physical object;

a datastore accessible over the network and arranged to store records associated with a plurality of physical objects previously inducted into the tracking system, the stored records including at least one digital fingerprint of each physical object of the plurality of physical objects previously inducted into the tracking system, each of the at least one digital fingerprint including a set of information that includes a plurality of stored feature vectors of a corresponding physical object of the plurality of physical objects; and a central server capable of data communications over the network with other components of the tracking system, the central server having:

a server processor; and a server memory accessible to the server processor, said server memory storing executable server program code to cause the server processor, by executing a received fingerprint portion of the server program code, to:

receive digital fingerprints over the network from at least one tracking unit of the plurality of tracking units;

query the datastore over the network based on each received digital fingerprint to determine whether the a respective received digital fingerprint matches at least one record associated with a physical object previously inducted into the tracking system;

based on a result of the query, store in the datastore each received digital fingerprint that was not matched to at least one record; and based on the result of the query, take a predetermined action.

14. The tracking system of claim 13 wherein the executable TU program code is further configured to cause the TU processor, by executing a downstream tracking unit portion of the program code, to:

construct and send a message over the network to a next downstream tracking unit of the tracking system, the message including the digital fingerprint or other identifier of the physical object, and a timestamp.

15. The tracking system of claim 13 wherein the executable TU program code is further configured to cause the TU processor, by executing a central server message portion of the program code, to:

construct and send a message over the network to the central server, the message including the digital fingerprint or other identifier of the physical object located within the corresponding field of view of the at least one scanner, and a timestamp.

16. The tracking system of claim 15 wherein the executable server program code is further arranged to cause the server processor, by executing a routing portion of the server program code, to:

for each physical object being routed by the tracking system, maintain and update data indicating:

a designated destination for the physical object being routed;

a set of one or more tracking units that should capture the physical object being routed;

an order of routing through the set of one or more tracking units; and control information that indicates operations of one or more diverters in the tracking system to route the physical object being routed to a designated destination of the physical object being routed.

17. The tracking system of claim 13 wherein the executable server program code further causes the server processor, by executing a failure detection portion of the server program code, to:

detect a failure of one tracking unit of the plurality of tracking units; and instruct a different one or more tracking units of the plurality of tracking units to take over selected operations in place of the failed tracking unit.

18. The tracking system of claim 17 wherein the executable server program code is further arranged to cause the server processor, by executing a record update portion of the server program code, to:

receive messages from at least one tracking unit of the plurality of tracking units; and maintain and update records in the datastore based on the received messages.

19. The tracking system of claim 17 wherein the executable server program code is further arranged to cause the server processor, by executing a heart beat monitor portion of the server program code, to:

monitor "heart beat" signals from the one or more tracking units of the plurality of tracking units; and based on the monitoring, detect a failure of any tracking unit of the plurality of tracking units.

20. The tracking system of claim 13 wherein the executable server program code is further arranged to cause the server processor, by executing a nearby tracking unit identification portion of the server program code, to:

identify, for each tracking unit of the plurality of tracking units, at least one of a next upstream tracking unit and a next downstream tracking unit that the respective tracking unit is to communicate with.

21. The tracking system of claim 13 wherein the executable server program code is further arranged to cause the server processor, by executing a recovery portion of the server program code, to:

recover the tracking system from at least one of a jam and a loss of positive control of at least one of the plurality of physical objects previously inducted into the tracking system.

22. The tracking system of claim 21 wherein the executable server program code is further arranged to cause the server processor to recover the tracking system, by executing the recovery portion of the server program code, to:

send at least one message to each tracking unit of the plurality of tracking units, the at least one message instructing the tracking unit to:

generate identification information for each object that enters the respective contiguous field of view of the tracking unit;

pass the identification information to at least one downstream tracking unit; and return the identification information and timing information to the central server;

based on the identification information and the timing information returned to the central server, determine:

which physical objects of the plurality of physical objects are permitted to keep going; which physical objects of the plurality of physical objects will be diverted; and which physical objects of the plurality of physical objects need manual attention because the tracking system is unable to dynamically direct said physical objects to a designated destination; and based on the determinations, send messages over the network to each tracking unit of the plurality of tracking units that is affected by the determination.

23. The tracking system of claim 22 wherein the executable server program code is further arranged to cause the server processor, by executing a successful identification portion of the server program code, to:

determine whether each expected one of the plurality of physical objects has been successfully identified and located within the system field of view; and based on a positive result of the determination that each expected one of the plurality of physical objects has been successfully identified and located, send at least one message over the network to the plurality of tracking units to return to a pre-exception condition.

24. The tracking system of claim 13 wherein the executable server program code is further arranged to cause the server processor, by executing a loss of control portion of the server program code, to:

detect a loss-of-control event in the tracking system.

25. The tracking system of claim 24 wherein the executable server program code is further arranged to cause the server processor, by executing an affected object portion of the server program code, to:

identify each physical object of the plurality of physical objects in the tracking system that is affected by the detected loss-of-control event.

26. The tracking system of claim 25 wherein the executable server program code is further arranged to cause the server processor, by executing an affected object recovery portion of the server program code, to:

send at least one message over the network identifying all physical objects of the plurality of physical objects in the tracking system that are affected by the detected loss-of-control event.

27. The tracking system of claim 25 wherein the executable server program code is further arranged to cause the server processor, by executing a notification portion of the server program code, to:

select downstream tracking units based on ones of the plurality of tracking units that identified physical objects of the plurality of physical objects in the tracking system that are affected by the detected loss-of-control event; and notify the selected downstream tracking units, over the network, to convey the identified physical objects of the plurality of physical objects along the physical system to respective destinations in accordance with the records stored in the datastore.

28. The tracking system of claim 13 wherein the executable server program code is further configured, by executing an aggregation portion of the server program code, to:

receive a message over the network indicating aggregation of two or more physical objects of the plurality of physical objects in the tracking system; and execute a predetermined aggregation routine for tracking aggregated physical objects as a single object.

29. The tracking system of claim 28 wherein the executable server program code is further configured, by executing a records update portion of the server program code, to:

update the records stored in the datastore corresponding to the aggregated physical objects to reflect the aggregation.

* * * * *